United States Patent
Sugimori

(10) Patent No.: US 8,334,910 B2
(45) Date of Patent: Dec. 18, 2012

(54) IMAGE CAPTURING APPARATUS, INFORMATION PROCESSING APPARATUS, AND CONTROL METHODS THEREOF

(75) Inventor: Masami Sugimori, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 12/027,864

(22) Filed: Feb. 7, 2008

(65) Prior Publication Data

US 2008/0211924 A1  Sep. 4, 2008

(30) Foreign Application Priority Data

Feb. 9, 2007   (JP) ................................. 2007-031280
Feb. 28, 2007  (JP) ................................. 2007-050196
Dec. 19, 2007  (JP) ................................. 2007-327994

(51) Int. Cl.
*H04N 9/73* (2006.01)

(52) U.S. Cl. .................. 348/223.1; 348/222.1; 382/162; 382/167

(58) Field of Classification Search ............... 348/222.1, 348/223.1, 225.1, 273, 277, 278, 279, 280; 382/162–167, 266, 267, 300; 345/419, 597–604
See application file for complete search history.

(56) References Cited

U.S. PATENT DOCUMENTS

| | | | |
|---|---|---|---|
| 5,073,818 A | | 12/1991 | Iida |
| 5,987,167 A * | 11/1999 | Inoue | 382/167 |
| 2002/0021360 A1* | 2/2002 | Takemoto | 348/222 |
| 2004/0012691 A1* | 1/2004 | Takahashi | 348/222.1 |
| 2004/0017595 A1* | 1/2004 | Ikeda | 358/518 |
| 2004/0036898 A1* | 2/2004 | Takahashi | 358/1.9 |
| 2005/0063585 A1* | 3/2005 | Matsuura | 382/162 |
| 2006/0250858 A1* | 11/2006 | Houda et al. | 365/189.12 |
| 2007/0041634 A1* | 2/2007 | Sugimori | 382/162 |
| 2008/0007564 A1 | 1/2008 | Tokunaga | |
| 2010/0111489 A1* | 5/2010 | Presler | 386/52 |

FOREIGN PATENT DOCUMENTS

| | | |
|---|---|---|
| JP | 2004-112694 A | 4/2004 |
| JP | 2005-295444 A | 10/2005 |
| JP | 2006-157892 A | 6/2006 |
| JP | 2006-222783 A | 8/2006 |
| JP | 2006-262451 A | 9/2006 |

* cited by examiner

*Primary Examiner* — Chieh M Fan
*Assistant Examiner* — Angel L Garces-Rivera
(74) *Attorney, Agent, or Firm* — Carter, DeLuca, Farrell & Schmidt LLP

(57) ABSTRACT

An image capturing apparatus having a three-dimensional grid data table holds a matrix coefficient which is a basis of the three-dimensional grid data table, and editing data for editing grid point data of the three-dimensional grid data table. To set the three-dimensional grid data table, the grid point data of the three-dimensional grid data table is calculated by performing a matrix operation using the matrix coefficient, and the calculated grid point data of the three-dimensional grid data table that is calculated based on the editing data is edited based on the editing data. Image data acquired by image capture is thus processed using the edited three-dimensional grid data table.

22 Claims, 13 Drawing Sheets

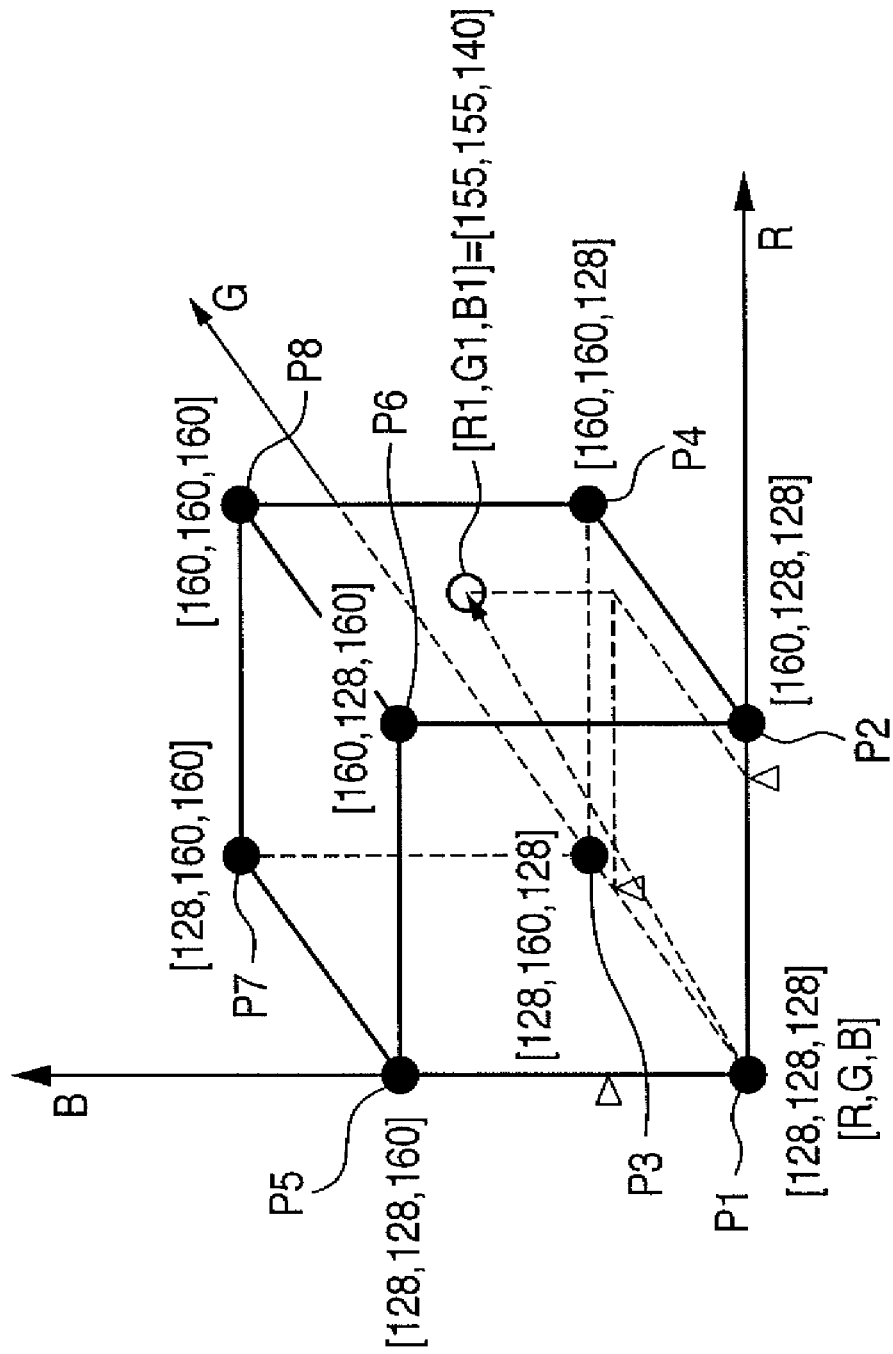

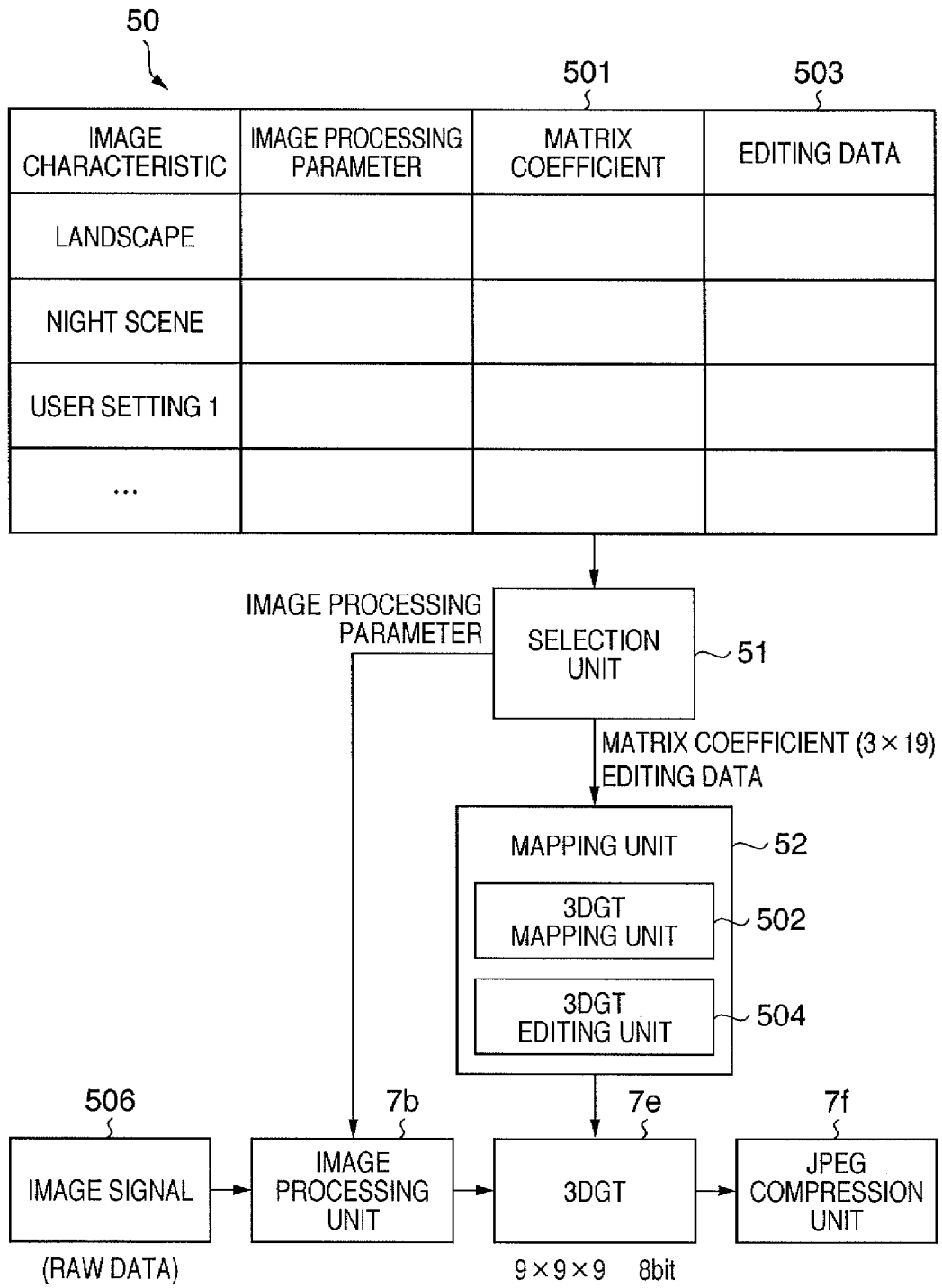

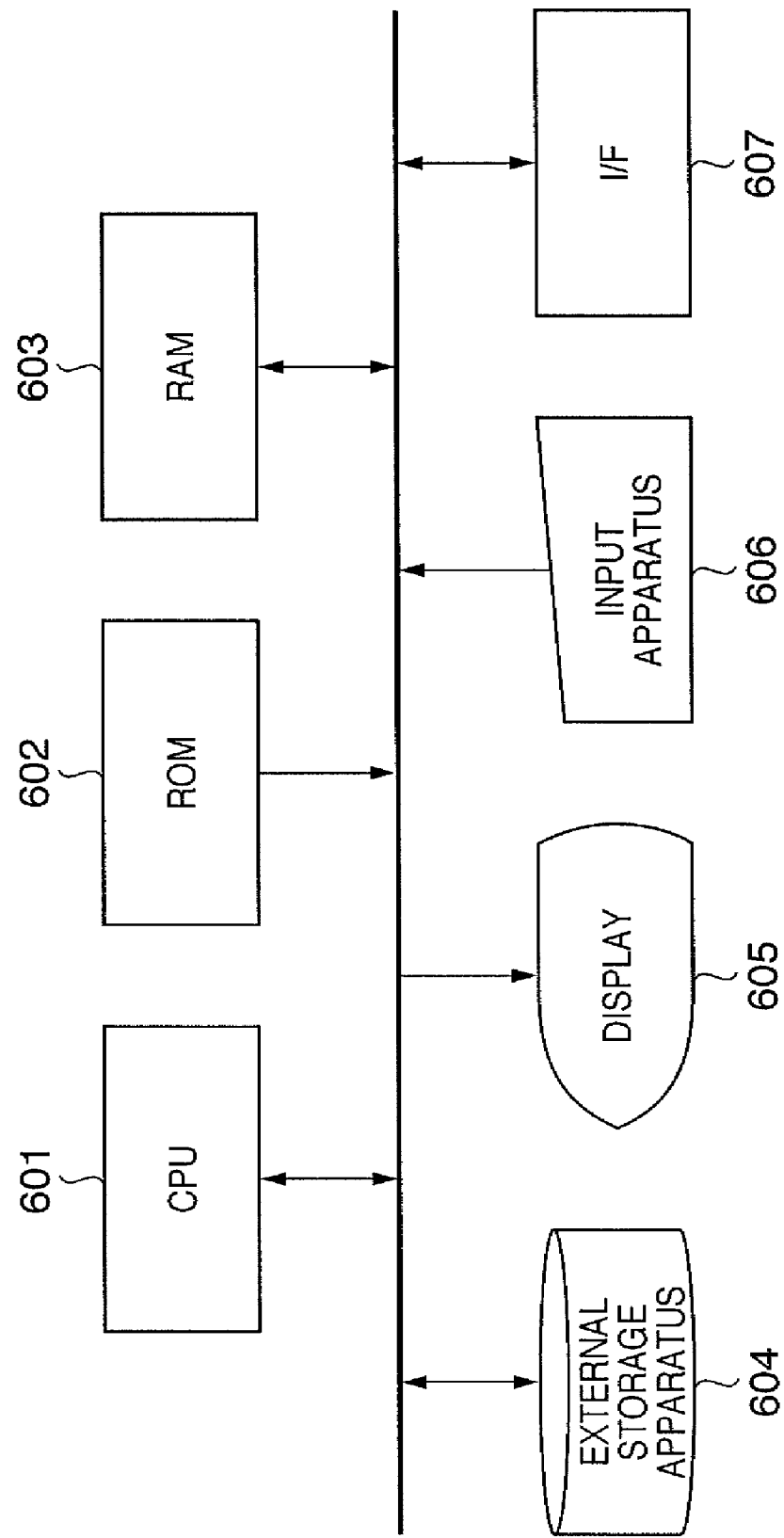

IMAGE CAPTURING APPARATUS, INFORMATION PROCESSING APPARATUS, AND CONTROL METHODS THEREOF

BACKGROUND OF THE INVENTION

1. Field of the Invention

The present invention relates to an image capturing apparatus, an information processing apparatus, and control methods thereof. The present invention more particularly relates to an image capturing apparatus such as a digital camera capable of selecting and setting image processing parameters, and a control method thereof, and to an information processing apparatus and method for generating image processing parameters settable in the image capturing apparatus.

2. Description of the Related Art

Generally, 3×3 matrix operations and one-dimensional lookup tables are used to perform various conversion processes (e.g., gamma transformation) as part of in-camera image processing. These conversion processes are preferred techniques for cutting hardware memory and the number of gates to reduce chip size, and downsizing in order to realize energy savings. However, in recent years, chip downsizing and stronger energy savings have become realizable as a result of advances in hardware miniaturization and the lowering of IC power voltages. This has enabled complex circuitry and mass memory to be loaded in ICs. Therefore, the possibility has emerged of being able to load three-dimensional lookup tables (hereinafter, three-dimensional grid data tables) and high-order matrix operations in digital cameras, and execute complex image processing as part of the in-camera image processing (see U.S. Pat. No. 5,073,818).

However, executable image processing is limited in digital cameras, given user interface and hardware resource constraints. For example, in-camera image processing adjustment is limited to selecting one of a plurality of predetermined image characteristics, and enabling the chroma of the selected image characteristic to be varied or the hue of a portion to be rotated. Therefore, the users may not themselves be able to obtain the color reproduction they really desire. Consequently, JPEG images generated by the digital camera or images developed from raw data need to be adjusted to the desired image using an image processing application run on an information processing apparatus such as a personal computer. Therefore, it takes time in terms of workflow to obtain images with desired color reproduction. Image characteristics can be adjusted relatively freely when an image processing application is used. In particular, three-dimensional grid data tables and high-order matrix operations of second-order or higher enable color reproduction to be finely adjusted, and contribute greatly to the adjustment of image characteristics.

However, while these three-dimensional grid data tables and high-order matrix operations of second-order or higher are generally considered versatile adjustment mechanisms, tone jump and the like occurs when there is a great amount of change from the original image, causing image deterioration.

With IC hardware, there are constraints on the bit number and the number of grid points of grid data tables, often making it impossible to perform high-precision image processing such as that performed with an application. In the case where raw image data is developed with an application, for example, lookup table data needs to be recorded in the image capture file. The size of the raw image file is therefore increased. With a three-dimensional grid data table having m grids, for example, there are m grids per dimension, giving a total of $m^3$ grids. Consequently, an m-grid three-dimensional grid data table with three n-bytes allocated per grid requires a capacity of $m^3 \times n \times 3$ bytes. Specifically, an 8-bit (1 byte) three-dimensional grid data table with 9 grids requires a capacity of (9×9×9×3=) 2187 bytes. In contrast, a 16-bit (2 byte) three-dimensional grid data table with 33 grids requires a capacity of (33×33×33×2×3=) 215622 bytes, or a 100-fold greater capacity. Where there is a plurality of three-dimensional lookup tables selectable by the user, for example, all of the three-dimensional lookup tables are preferably recorded in a file, in order to perform subsequent developing. Therefore, the file size further increases, and it takes time to record the file to memory. As a result, the number of shots that can be taken in the continuous shooting mode is restricted.

U.S. Pat. No. 5,073,818 discloses a printer with a lookup table circuit for performing image processing. According to U.S. Pat. No. 5,073,818, a lookup table for converting images is actually created from corrective functions because of the large file size when all of the lookup data is stored.

However, producing all of the data with a lookup table to perform image processing with high bit precision results in the data size of the lookup table being huge, and the scale of circuitry also increases. Further, using high-order matrix operations to perform image processing with high bit precision requires a large number of multipliers, and the number of gates increases markedly with increases in the bit number. Even if nothing more than second-order matrix operations are used, the degree of freedom of the image processing is actually restricted more than processing that uses a three-dimensional grid data table.

Also, if high-order matrix operations are used, there are an extremely large number of parameters for the target image, and because the entire image is actually optimized using the least-squares method, it is not always possible to convert all of the input image data to desired target colors. Further, depending on the matrix, the accuracy of output colors relative to the target can be improved by increasing the order. However, colors may vary unexpectedly in a color gamut having no input image data as a result of increasing the order, and it may not be possible to successfully optimize color reproduction. Ultimately, there has been little success in resolving this problem, apart from performing optimization after reducing the order of the matrix, which increases the difference from target values. That is, while the information amount of matrix operations is low, the degree of freedom of image processing is restricted more than processing that uses a three-dimensional grid data table.

Also, in the case where image processing using an algorithm that differs from the in-camera image processing is performed with an application, the camera needs to already have coefficients that will give a similar processing result. In this case, a large amount of data for three-dimensional grid data tables that is not used in in-camera image processing must be stored on the ROM of the camera, markedly reducing memory use efficiency.

SUMMARY OF THE INVENTION

According to an exemplary embodiment of the present invention, an image processing apparatus and method are provided that are able to prevent the occurrence of problems such as tone jump, in the case where a user adjusts image processing parameters to realize desired color reproduction.

According to another embodiment of the present invention, an image processing apparatus and method are provided that are able to improve the degree of freedom and precision of image processing, while conserving memory by holding a matrix coefficient.

According to one aspect of the present invention, there is provided an image capturing apparatus that has a three-dimensional grid data table, including: a holding unit configured to hold a matrix coefficient which is a basis of the three-dimensional grid data table, and editing data for editing grid point data of the three-dimensional grid data table; a calculating unit configured to calculate the grid point data of the three-dimensional grid data table by performing a matrix operation using the matrix coefficient; an editing unit configured to edit the grid point data of the three-dimensional grid data table calculated by the calculating unit, based on the editing data; and a processing unit configured to process image data acquired by image capture, using the three-dimensional grid data table edited by the editing unit.

Further features of the present invention will become apparent from the following description of exemplary embodiments with reference to the attached drawings.

BRIEF DESCRIPTION OF THE DRAWINGS

FIGS. 3A to 3D show color interpolation performed as part of image processing according to the first embodiment.

FIG. 4 illustrates grid point data in a grid data table of the first embodiment.

FIG. 5 is a block diagram showing the flow of raw data processing by the digital camera of the first embodiment.

FIG. 6 is a block diagram showing an exemplary configuration of an information processing apparatus of the first embodiment.

DESCRIPTION OF THE EMBODIMENTS

Exemplary embodiments of the present invention will now be described in detail in accordance with the accompanying drawings.

First Embodiment

Figure 1:
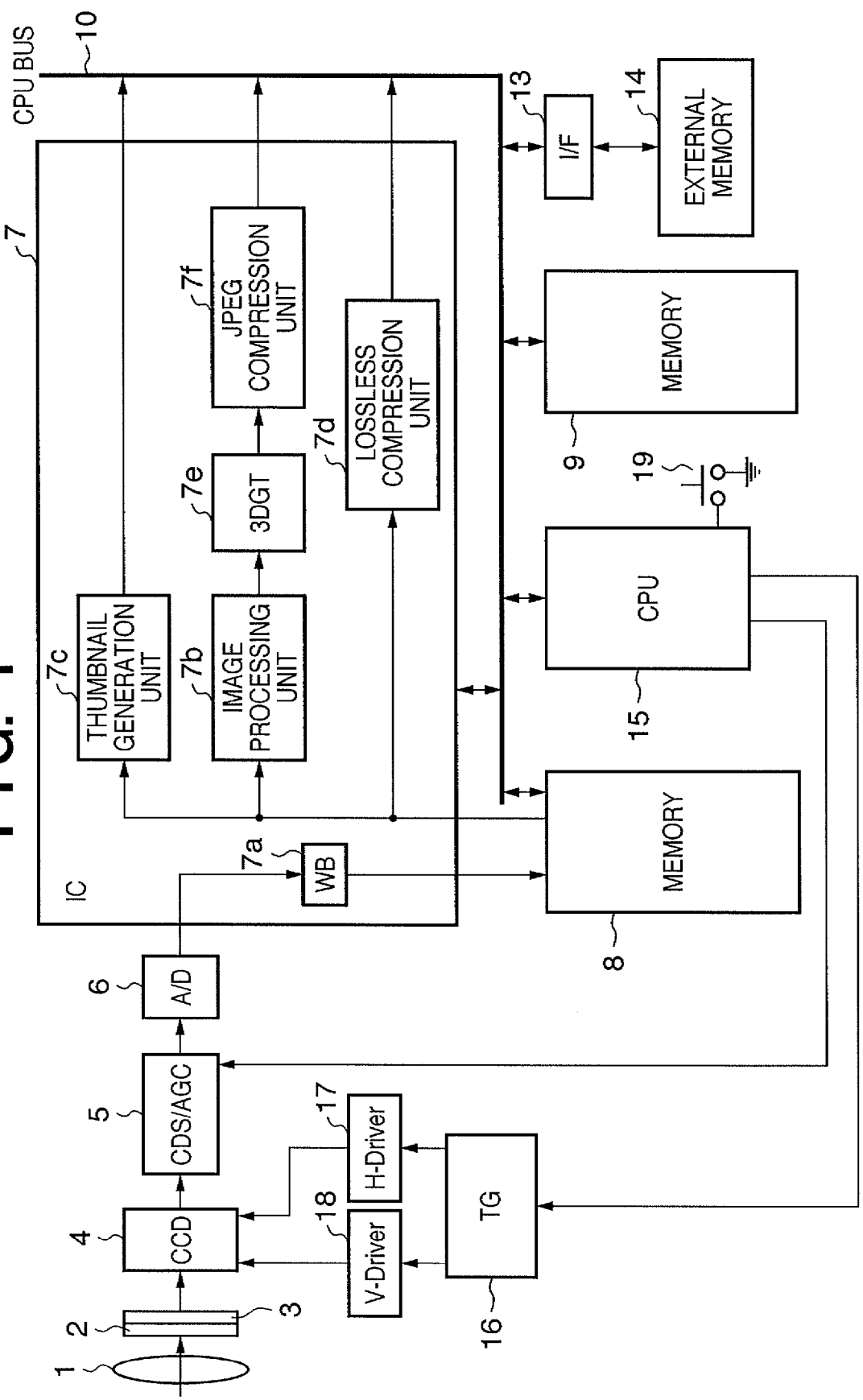
FIG. 1 is a block diagram showing an exemplary configuration of a digital camera according to a first embodiment.

FIG. 1 is a block diagram showing the configuration of a digital camera according to a first embodiment. In FIG. 1, light that has passed through an image capture lens 1 forms an image on an image capturing element 4 after passing through an infrared cut filter 2 and an optical low pass filter (LPF) 3. A CCD or CMOS sensor is given as an example of the image capturing element 4. Sensors composed of photo diodes are generally disposed in a plane on the light receiving surface of the image capturing element 4. One color is allocated to each sensor by color filtering in which R (red), G (green) and B (blue) primary color filters are disposed in a prescribed array. Alternatively, image capturing elements 4 equal in number to the number of primary colors may be provided, and one color allocated to each image capturing element.

Light that has formed an image on the image capturing element 4 is converted into electric charge of an amount that depends on the amount of light incident on the sensors. A signal generated by a timing generator 16 is supplied to a horizontal driver 17 and a vertical driver 18. The horizontal driver 17 and the vertical driver 18 supply drive signals to the image capturing element 4, in accordance with the signal from the timing generator 16. Charge stored in the sensors is conveyed from the image capturing element 4 in accordance with these drive signals, and sequentially converted to a voltage signal. The reference numeral 19 denotes a shutter button of the digital camera. A CPU 15 controls the timing generator 16, so that image capture is executed by the image capturing element 4 in response to the shutter button 19 being depressed.

The converted voltage signal is sampled by a correlated double sampling/automatic gain control (CDS/AGC) unit 5, and converted into a digital signal by an analog-to-digital (A/D) converter 6 after undergoing gain control. The image data converted to a digital signal by the A/D converter 6 is input to an image processing IC 7. The image processing IC 7 has a white balance (WB) circuit 7a, an image processing unit 7b, a thumbnail generation unit 7c, a lossless compression unit 7d, a three-dimensional grid table (3DGT) 7e, and a JPEG compression unit 7f. In the image processing IC 7, firstly the WB circuit 7a calculates data for performing white balance on the input image data. The white balance data and the image data are temporarily stored in a memory 8.

The image data stored in the memory 8 is again input to the image processing IC 7, and undergoes the following three processes.

(1) The image data converted to a digital signal directly undergoes lossless compression in the lossless compression unit 7d, and is sent to a CPU bus 10 as raw data.

(2) The image data converted to a digital signal is converted by the thumbnail generation unit 7c to a thumbnail image smaller in size than the original image by downsampling such as decimation, and sent to the CPU bus 10. Note that decimation involves downsampling by performing known block averaging on raw data, for example.

(3) In order to produce an image for JPEG compression, firstly image processing is performed on the image data converted to a digital signal in the image processing unit 7b (described in detail below using FIG. 2). YCbCr color space image data output as a result is input to the three-dimensional grid data table 7e. Image data converted by the three-dimensional grid data table unit 7e is sent to the CPU bus 10 after undergoing raster block conversion and JPEG compression by the JPEG compression unit 7f.

Note that in the present embodiment, a three-dimensional lookup table and a three-dimensional grid data table are defined as different tables. However, the two tables will be synonymous where the number of grid points of the three-dimensional lookup table and the three-dimensional grid data table are the same.

The losslessly compressed raw data and the JPEG compressed image data are stored in a memory 9 via the CPU bus 10. The CPU 15 generates a raw file by attaching the JPEG compressed image to the raw data stored in the memory 9. In the present embodiment, the CPU 15 attaches the JPEG compressed image as preview data of the raw data. The generated raw file is stored in an external memory 14 removably connected via an interface (I/F) 13. In the above configuration, the three-dimensional grid data table 7e is generated together with raw data when image capture is performed, and used for generating a JPEG image. In the case of outputting raw data, the three-dimensional grid data table 7e is used for generating a preview JPEG image to be attached to a raw file.

Note that control programs for realizing the above processing by the CPU 15 are assumed to be stored in the memory 8 or the memory 9.

Next, the image processing performed by the image processing unit 7b will be described in further detail with reference to FIG. 2. FIG. 2 is a block diagram showing the configuration of the image processing unit 7b in detail.

Figure 2:
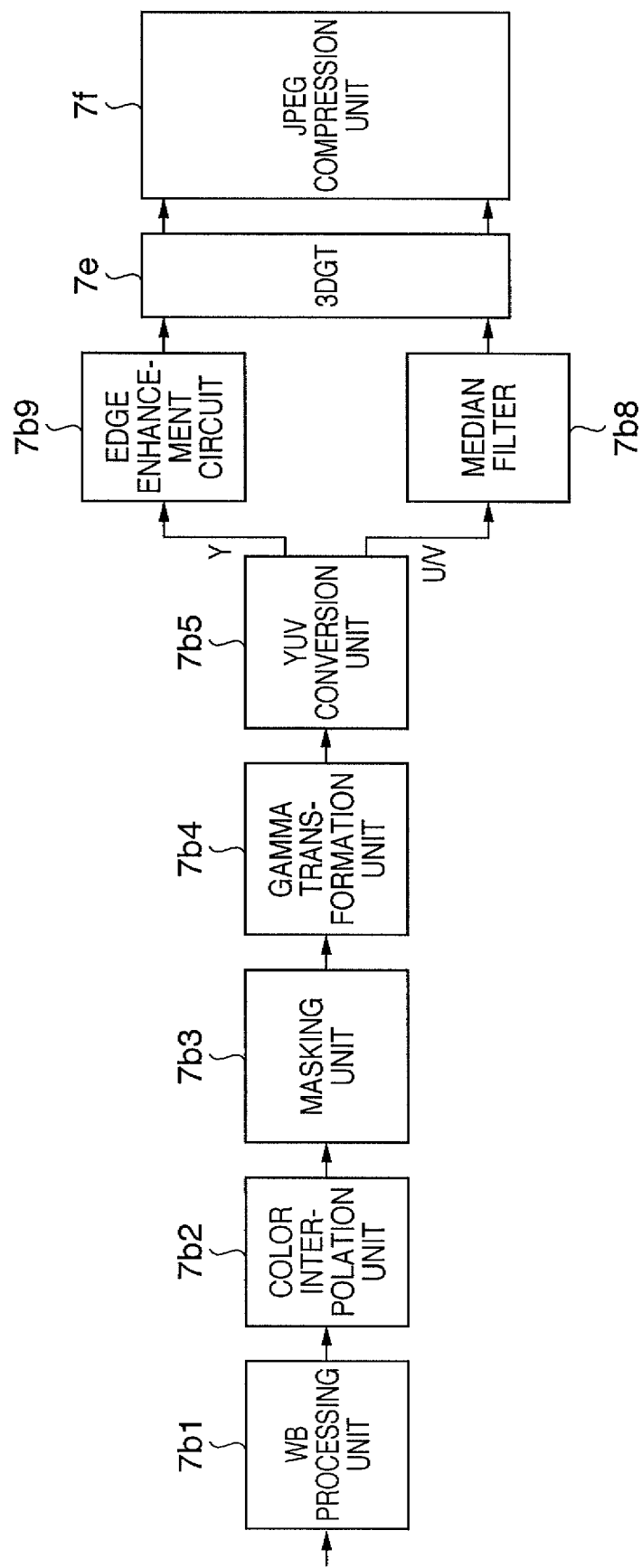
FIG. 2 is a block diagram showing in detail an image processing unit in the digital camera according to the first embodiment.
Figures 3A, 3B, 3C, 3D:
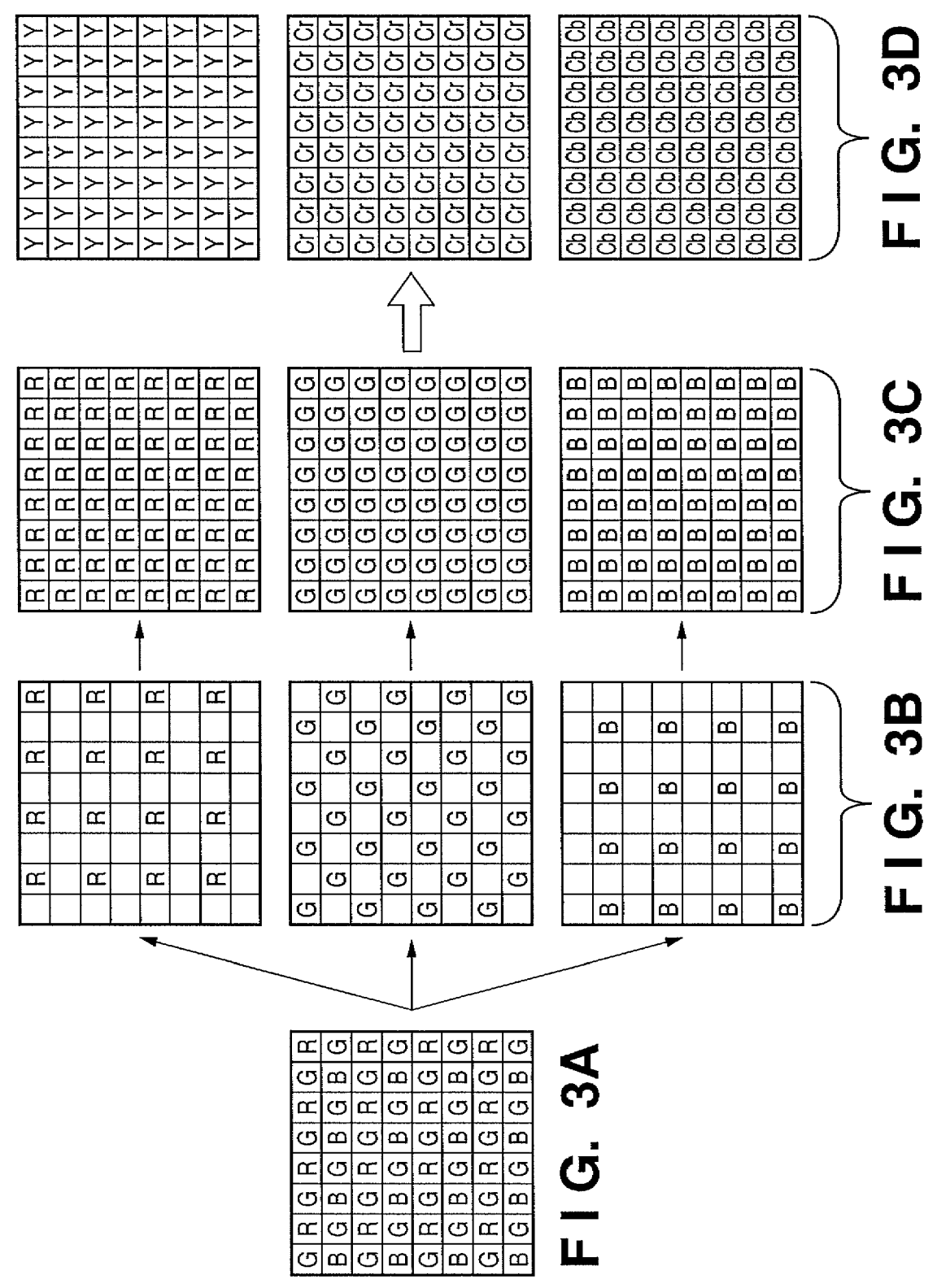

In FIG. 2, the image data input from the memory 8 is firstly supplied to a white balance (WB) processing unit 7b1. The WB processing unit 7b1 performs white balance on the image data using a white balance coefficient. The white balance coefficient is calculated by the CPU 15 based on white balance data calculated by the WB circuit 7a, stored in the memory 8, and is set in a register of the IC 7 as necessary. Alternatively, white balance may be performed on the input image data using a preset white balance coefficient (e.g., a white balance coefficient preset according to the light source such as daylight, tungsten, fluorescent, etc.). Image data that has undergone white balance is input to a color interpolation unit 7b2, and undergoes color interpolation. As shown in FIGS. 3A to 3D, three R, G and B planes (FIG. 3C) are produced from the data of the pattern in which RGB are arrayed in a grid (FIGS. 3A, 3B).

Next, color optimization is performed on the image data of all three RGB planes in a masking unit 7b3 with a 3×3 matrix operation (equation 1), for example.

$R' = m11 \times R + m12 \times G + m13 \times B$ $G' = m21 \times R + m22 \times G + m23 \times B$ $B' = m31 \times R + m32 \times G + m33 \times B$ (1)

The image data is supplied to a gamma transformation unit 7b4 after passing though the masking unit 7b3. The gamma transformation unit 7b4 performs gamma transformation on the image data. A YUV conversion unit 7b5 converts the image data of the RGB signals gamma transformed by the gamma transformation unit 7b4 to YUV signals composed of luminance and color difference components, and generates the three Y, Cb, Cr planes shown in FIG. 3D. The image data is converted to YUV signals in order to perform false color processing and edge enhancement.

In the case of creating a JPEG image, the luminance signal (Y) out of the YUV signals is edge enhanced by an edge enhancement circuit 7b9, and the color difference component signal (UV) out of the YUV signals undergoes noise processing by a median filter 7b8.

The edge enhanced Y signal and the noise processed UV signal are then input to the three-dimensional grid data table 7e, and color converted. The YUV data output from the three-dimensional grid data table 7e is JPEG compressed by the JPEG compression unit 7f.

Here, the three-dimensional grid data table 7e can be located before the image data undergoes JPEG or similar compression and at least after the white balance. Further, the three-dimensional grid data table 7e can be performed last after the image data has undergone white balance, color interpolation, masking, gamma transformation, YUV conversion, edge enhancement, and median filtering, as aforementioned. This allows the user's intended colors locally converted by the three-dimensional grid data table 7e to be maintained in the output image without being changed by the various processing.

Next, the three-dimensional grid data table 7e will be described in detail. FIG. 4 shows part of a three-dimensional grid data table. Here, the input is described as being RGB signals, although in FIGS. 1 and 2 the input is YUV signals. The YUV signals may be converted back to RBG signals in the three-dimensional grid data table 7e, or the three-dimensional grid data table itself can also be provided with YUV values.

In the case where the input data is [R1, G1, B1]=[155, 155, 140], the position of the input data in a three-dimensional grid data table having nine grid points (nine grids) is surrounded by eight grid points such as shown in FIG. 4. In this case, when simple linear interpolation is performed on the above input data, the value of red can be calculated by interpolating the data at P1 and P2, interpolating the data at P3 and P4, interpolating the data at P5 and P6, and interpolating the data at P7 and P8. Note that P1=[128, 128, 128], P2=[160, 128, 128], P3=[128, 160, 128], P4=[160, 160, 128]. P5=[128, 128, 160], P6=[160, 128, 160], P7=[128, 160, 160] and P8=[160, 160, 160].

Assuming that the value of the [128, 128, 128] grid point (P1) is [130, 120, 120], and the value of the [160, 128, 128] grid point (P2) is [165, 120, 120], the value of the position [155, 128, 128] will be $(165-130)/(160-128) \times (155-128)+130=159.5$ (2)

Interpolation is also similarly performed for the other three places (P3–P4, P5–P6, P7–P8), and the value of red at the point [155, 155, 140] is finalized from the result of these calculations. These computations are also performed in relation to green and blue, and the RGB values at [155, 155, 140] are determined.

The above computations are extremely simple, and enable the scale of circuitry to be reduced far below that for performing high-order matrix operations.

Assuming, for example, that a matrix operation is performed up to the third-order, $$\begin{aligned} Red = &m01 \times R + m02 \times G + m03 \times B + \\ &m04 \times R \times R + m05 \times G \times G + m06 \times B \times B + m07 \times R \times G + \\ &m08 \times R \times B + m09 \times G \times B + m10 \times R \times R \times G + \\ &m11 \times R \times R \times B + m12 \times R \times R \times R + m13 \times R \times G \times G + \\ &m14 \times G \times G \times B + m15 \times G \times G \times G + m16 \times R \times B \times B + \\ &m17 \times G \times B \times B + m18 \times B \times B \times B + m19 \times R \times G \times B \end{aligned}$$ (3)

This computation requires 19 coefficients, 45 multiplications, and 18 additions. Moreover, green and blue require similar circuitry.

While the above matrix operation can be realized with hardware, the scale of circuitry is considerable. However, compared with the number of parameters for a single image characteristic, the data amount of a matrix coefficient set is far smaller than the data amount of 9×9×9 grid points. Consequently, from the viewpoint of memory usage, matrix operations are advantageous.

In view of this, in the present embodiment, a high-order matrix coefficient set that forms the basis of a three-dimensional grid data table is stored in the camera, rather than directly storing a three-dimensional grid data table. A three-dimensional grid data table is then generated using this high-order matrix coefficient set. For example, the foregoing m01-m19 matrix coefficient set is stored, and the red value of the grid points is derived by substituting the R, G and B values of the grid points of the three-dimensional grid data table in equation 3, prior to the developing process. The green and blue values are similarly derived for the grid points. Three-dimensional grid point data is thus generated, and the generated data is set in the three-dimensional grid data table 7e.

As described above, the foregoing matrix operations can be constituted by hardware, although the scale of circuitry becomes considerably large. Also, high-order matrix operations can be performed by an application, although the computations take time. According to the present embodiment, not only is memory conserved by storing a matrix coefficient set, but this operation time is shortened by producing the three-dimensional grid data table from the matrix coefficient set during the image processing.

More specifically, high-order matrix data (matrix coefficients) that form the basis of three-dimensional grid data tables are stored in the camera, rather than directly storing three-dimensional grid data tables, as shown in FIG. 5. A matrix coefficient is converted to a three-dimensional grid data table before developing the parameters used by the camera, and the grid point data of the table is locally replaced in accordance with editing data held as a pair with the matrix coefficient. The editing data shows a chromaticity point to be edited, a hue angle range and an amount of change of the hue angle, and will be described in detail later. Local areas of the three-dimensional grid data table are rewritten in accordance with the editing data, and the obtained grid point data is used as the three-dimensional grid data table 7e.

As described above, in the digital camera of the present embodiment, raw data is developed by the image processing unit 7b, and the developed image data is adjusted by the three-dimensional grid data table 7e to obtain the final image data (image data for JPEG compression).

The operations of a digital camera having the above configuration will now be described. FIG. 5 is a block diagram illustrating the flow of in-camera processing from the developing process until image compression according to the present embodiment.

A selection unit 51 presents a screen for selecting image characteristics held by an image characteristic holding unit 50 (constituted in the memory 8, for example) on a display of the digital camera. Using this selection screen, the user is allowed to select an image processing parameter to be set in the image processing unit 7b, and a matrix coefficient and editing data for the three-dimensional grid data table 7e. Note that in the present specification, parameters to be set in the image processing unit 7b out of the parameters in the image characteristics are referred to as image processing parameters. Also, the image characteristics are assumed to include editing data and matrix coefficients for generating the three-dimensional grid data table 7e.

The selection unit 51 extracts an image processing parameter, a matrix coefficient and editing data from the image characteristic instructed for selection, and provides the image processing parameter to the image processing unit 7b and the matrix coefficient and editing data to a mapping unit 52. The mapping unit 52 executes a mapping process using a matrix coefficient 501 and editing data 503 provided by the selection unit 51, and determines the three-dimensional grid data table 7e.

A 3DGT mapping unit 502 generates three-dimensional grid point data using the high-order matrix coefficient 501 acquired from storage in the image characteristic holding unit 50 provided in the memory 8 of the camera. A 3DGT editing unit 504 acquires editing data (editing data 503) held in correspondence with the selected matrix coefficient. The editing data shows the editing content for editing the grid point data of local portions of the three-dimensional grid data table. The 3DGT editing unit 504 edits the grid point data of local portions of the three-dimensional grid data table mapped beforehand by the 3DGT mapping unit 502, in accordance with the editing data 503.

The case in which, for example, the editing data 503 instructs editing to rotate a hue range of ±5 degrees by +3 degrees, centered on a color at a hue angle of 20 degrees or a prescribed color (chromaticity point) corresponding to a hue angle of 20 degrees will be described. In this case, a range of ±5 degrees is selected centered on a grid point equivalent to a hue angle of 20 degrees in the three-dimensional grid data table, and the data of the selected grid point is rewritten to perform a 3 degree rotation in the + direction at the hue angle. Note that if, at this time, the amount of change (amount by which the hue angle is rotated) from editing exceeds the hue angle of adjacent grid point data, discontinuity occurs in the image, creating an image with tone reversal. In this case, the nearest grid point data outside the selected range needs to be linearly replaced, so that the center point (specified chromaticity) is able to rotate +5 degrees. Note that a variety of methods can be used to specify a color for adjustment, including identifying a color for adjustment by specifying hue, chroma and luminance in addition to the above, or specifying only hue and adjusting all colors that include the specified hue.

As described above, the editing data 503 includes a target value (chromaticity point) in color space indicating a color for editing, an extent of influence (hue angle range) indicating the extent of influence of the editing in color space, and an amount of change indicating the direction and size (rotation amount of hue angle) of change in color space due to the editing. The 3DGT editing unit 504 then edits the grid point data of the three-dimensional grid data table, so that the color in the hue angle range (color in the extent of influence) centered on the target value (chromaticity value) changes as shown by the amount of change (amount of rotation of hue angle).

Note that although the above editing data shows the target value by a chromaticity point, the extent of influence by a hue angle range, and the amount of change by the amount of change of a hue angle, the present embodiment is not limited to this configuration. For example, the amount of variation in chroma or brightness can also be used as the amount of change.

The three-dimensional grid data table 7e is generated as described above. An image signal 506 obtained by image capture undergoes image processing by the image processing unit 7b, and is converted by the three-dimensional grid data table 7e. Compression processing is then performed by the JPEG compression unit 7f, and a compressed image is obtained.

Note that the digital camera of the present embodiment is able to output a raw file that includes raw data. A matrix coefficient and editing data preselected from the image characteristic holding unit 50 are recorded in the header of the raw file.

Figure 8:
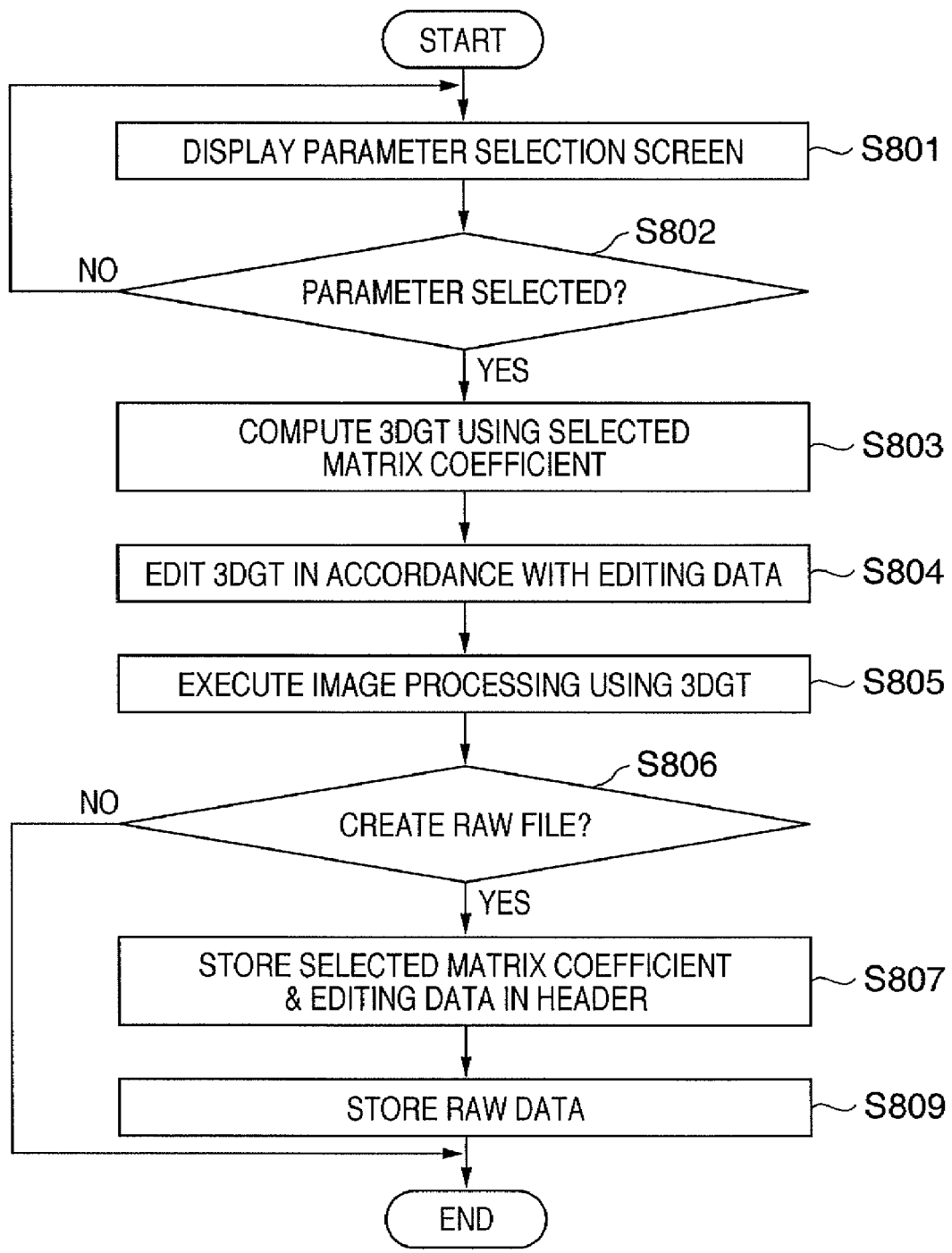
FIG. 8 is a flowchart illustrating the image processing of the digital camera according to the first embodiment.

The above processing will be described with reference to the flowchart of FIG. 8. The processing shown in FIG. 8 is executed by the CPU 15 executing a control program stored in the memory 8.

In step S801, the selection unit 51 displays a parameter selection screen on a display screen (not shown) of the digital camera, and allows the user to select a desired parameter (matrix coefficient/editing data pair). When a preset parameter such as "Night Scene" or "Landscape" is selected (YES in step S802), the 3DGT mapping unit 502 calculates the grid point data of a three-dimensional grid data table using the selected matrix coefficient (step S803). In step S804, the 3DGT editing unit 504 edits the grid point data calculated in step S803, using the editing data selected in step S801. In step S805, the image signal (raw data) 506 is processed using the image processing unit 7*b* and the edited three-dimensional grid data table 7*e*, and an image is obtained. The obtained image is compressed by the JPEG compression unit 7*f* and recorded in the external memory 14. Alternatively, the image is displayed on the display screen (not shown) of the digital camera in order to confirm the captured content.

In the case of creating a raw file (YES in step S806), the processing proceeds to step S807, and the matrix coefficient and editing data selected in step S801 are stored in the header of the raw file. Then, in step S809, the raw data is stored and the raw file is formed.

While the above description relates to a three-dimensional grid data table in the digital camera, the foregoing configuration in which a three-dimensional grid data table is generated from a matrix coefficient can also be applied to an application operating on an image processing apparatus such as a personal computer. In this case, the aforementioned processing that corresponds to the image processing unit 7*b* and the three-dimensional grid data table 7*e* is executed by the application.

FIG. 6 is a block diagram illustrating the configuration of an information processing apparatus of the present embodiment. A typical personal computer can be used as the information processing apparatus. In FIG. 6, a CPU 601 realizes the various processing by executing computer programs held in a ROM 602 or a RAM 603. The ROM 602 stores the basic input/output system and boot programs of the information processing apparatus. The RAM 603 functions as the main memory of the CPU 601. Programs installed on an external storage apparatus 604 are loaded into the RAM 603 for execution by the CPU 601. A display 605 performs various displays under the control of the CPU 601. An input apparatus 606 is constituted by a keyboard, a pointing device, and the like. An interface (I/F) 607 is capable of mounting the external memory 14 of the digital camera, and can import raw files recorded on the external memory 14 to the RAM 603 or the external storage apparatus 604. Alternatively, the interface 607 may be provided with a communication interface such as a USB. In this case, the information processing apparatus is connected to the digital camera via the interface 607, and is able to acquire data stored in the external memory 14 of the digital camera. Alternatively, setting data (described later) can be transmitted to the digital camera via the interface 607.

Various applications are installed on the external storage apparatus 604, and loaded into the RAM 603 when executed. Note that the external storage apparatus 604 is typically a hard disk. Hereinafter, an application (hereinafter, image processing application) will be described that involves processing a raw file generated by the foregoing digital camera, and generating a setting parameter for the in-camera image processing operations.

Figure 7:
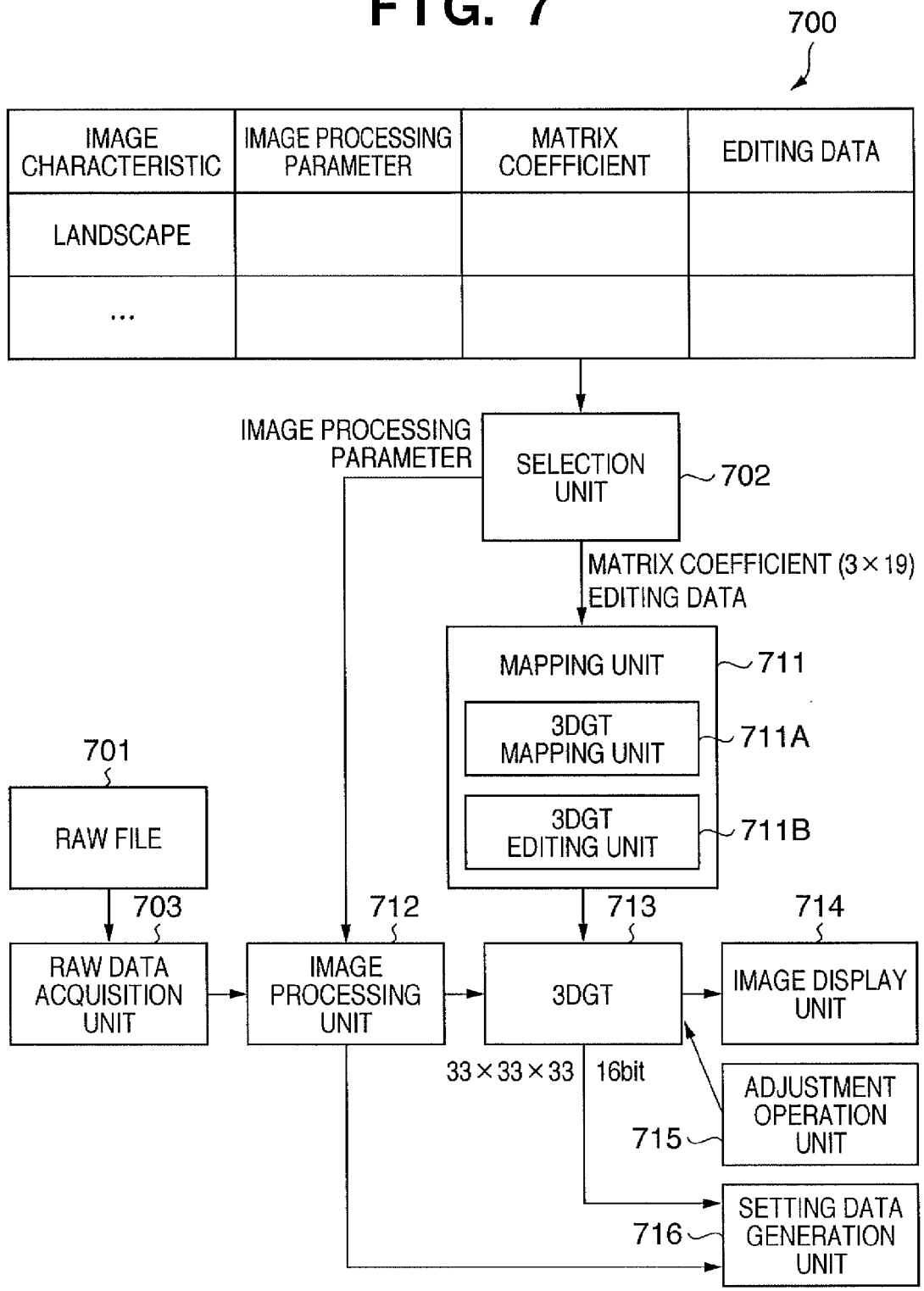
FIG. 7 is a block diagram showing the flow of raw data processing in the information processing apparatus of the first embodiment.

FIG. 7 is a block diagram illustrating an exemplary functional configuration of the image processing application according to the present embodiment. Note that the functions shown in FIG. 7 are realized by the CPU 601 executing a prescribed control program loaded into the RAM 603. High-order matrix operations can also be executed with the image processing application, although the computations (processing) take time. In view of this, in the present embodiment, the processing time is shortened by also creating a three-dimensional grid data table (3DGT 713) such as described above in the image processing application from a matrix coefficient.

Before creating image characteristics using such a three-dimensional grid data table, it is important to run in the image characteristics in an image processing unit 712 that corresponds to the image processing unit 7*b* with respect to the target image characteristics. Using the three-dimensional grid data table 713 also enables all the processing characteristics of the image processing unit 712 to be fixed, and corresponded with the three-dimensional grid data table. However, when the amount of change resulting from the three-dimensional grid data table 713 is significant relative to the original data, deterioration such as tone jump may occur in the image in that portion. In view of this, in the present embodiment, the three-dimensional grid data table is adjusted and determined by the following method.

A raw file 701 imported into the information processing apparatus via the interface 607 is assumed to be stored in the RAM 603. A selection unit 702 provides a user interface for allowing the user to select a desired image characteristic. For example, the names of a plurality of image characteristics stored in the image characteristic holding unit 700 are listed on the display 605, and the user is allowed to select a desired image processing characteristic (image processing parameter). In response to a selection operation by the user, the selection unit 702 extracts an image processing parameter to be set in the image processing unit 712 from the selected image processing characteristic, and sets the extracted image processing parameter in the image processing unit 712. The selection unit 702 also extracts the matrix coefficient and editing data from the selected image processing characteristic, and provides the extracted matrix coefficient and editing data to a mapping unit 711.

The mapping unit 711 maps the matrix coefficient provided by the selection unit 702, and generates the three-dimensional grid data table 713. The operations of the mapping unit 711 are similar to the mapping unit 52 in FIG. 5. That is, a 3DGT mapping unit 711A generates three-dimensional grid point data using a high-order matrix coefficient, and a 3DGT editing unit 711B edits the grid point data of local portions of the three-dimensional grid data table mapped beforehand by the 3DGT mapping unit 711A, in accordance with the editing data. The three-dimensional grid data table 713 is thus acquired.

A raw data acquisition unit 703 acquires raw data from the raw file 701. The image processing unit 712 develops the raw data acquired by the raw data acquisition unit 703, using the image processing parameter set by the selection unit 702. The processing content of the image processing unit 712 is equivalent to the processing described in relation to the image processing unit 7*b*. The pixel values of the image data developed by the image processing unit 712 are converted by the three-dimensional grid data table 713. An image display unit 714 displays the image data that results from the conversion by the three-dimensional grid data table 713 on the display 605.

An adjustment operation unit 715 provides a user interface for adjusting an image characteristic of the image displayed by the image display unit 714. Using this user interface, the user adjusts an image characteristic using a user interface such as shown in Japanese Patent Laid-Open No. 2006-157892, for example, to obtain desired color reproduction while viewing the image displayed on the display 605. For example, the user is able to arbitrarily input hue, chroma and contrast on the interface with chromaticity diagram coordinates and numerical values, and perform partial adjustment, so that the image displayed by the image display unit 714 changes to a desired image.

The adjustment operation unit 715 changes the grid point data of the three-dimensional grid data table to reflect the forgoing adjustment operation performed by the user using the user interface. The three-dimensional grid data table 713 constantly performs conversion processing on image data output from the image processing unit 712, and the conversion output is displayed on the image display unit 714. Therefore, the user is able to observe the change in an image resulting from the adjustment operation in real-time.

A setting data generation unit 716 generates a setting parameter (user setting parameter) that is settable in the digital camera, in accordance with the three-dimensional grid data table adjusted as described above and the image processing parameter set in the image processing unit 712.

Figure 9:
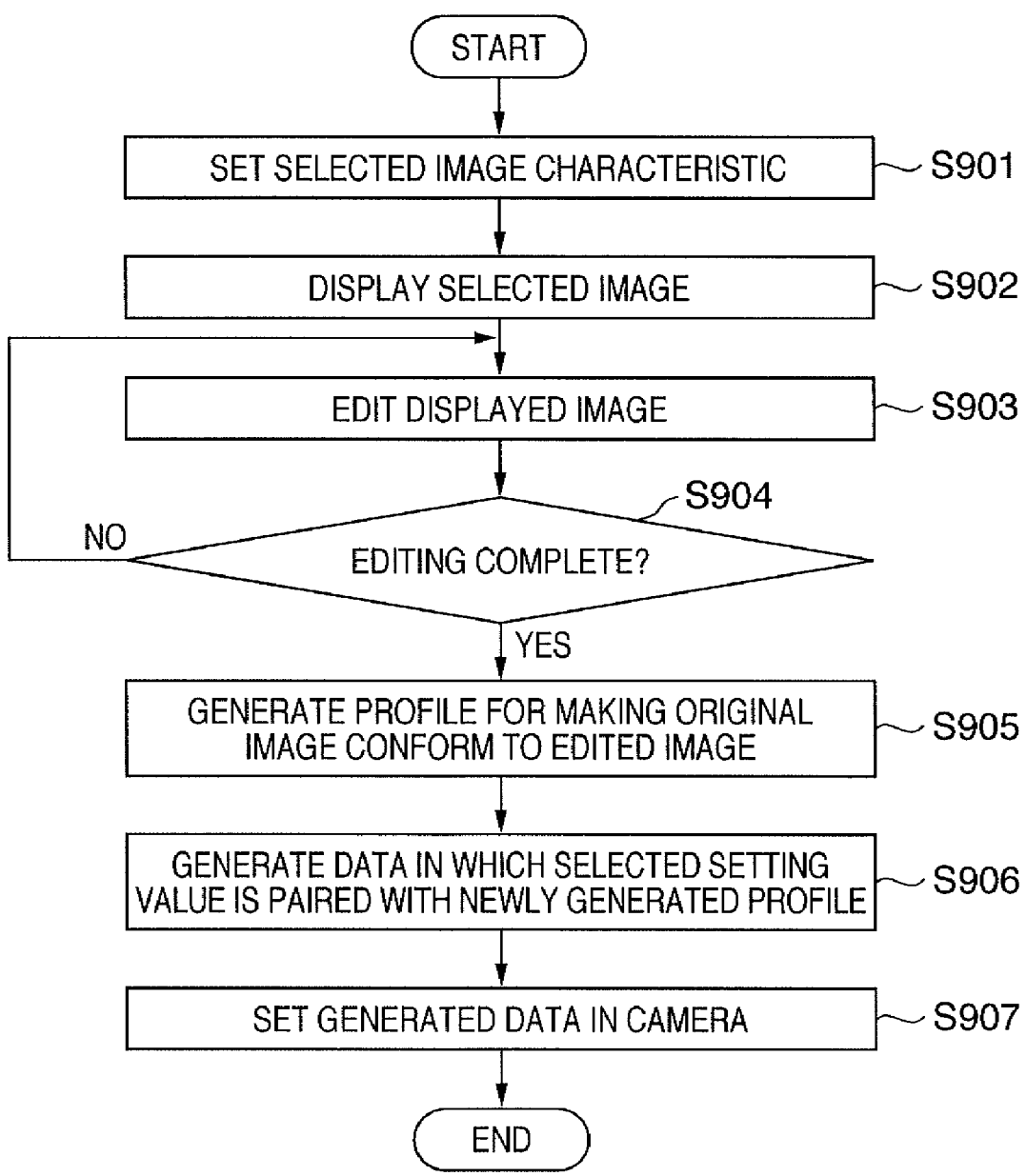
FIG. 9 is a flowchart illustrating image characteristic generation processing according to the first embodiment.

FIG. 9 is a flowchart illustrating the processing of the image processing application according to the first embodiment.

In step S901, the selection unit 702 provides a user interface for selecting an image characteristic, using the display 605 and the input apparatus 606, for example. Then, the selection unit 702 extracts the image processing parameter, matrix coefficient and editing data from the image characteristic selected according to a user operation. The selection unit 702 then sets the image processing parameter in the image processing unit 712, and provides the matrix coefficient and the editing data to the mapping unit 711. The mapping unit 711 generates a three-dimensional grid data table by mapping the provided matrix coefficient. The generated three-dimensional grid data table is edited locally in accordance with the editing data, and the three-dimensional grid data table 713 is set. Since a desired image characteristic can thus be selected using the selection unit 702, the user is able to obtain an image that has been image processed using an image characteristic that approximates his or her preferences.

Next, in step S902, the raw data acquisition unit 703 provides raw data for editing to the image processing unit 712. The raw data for editing is obtained, for example, by the raw data acquisition unit 703 displaying a list of raw files on the display 605, and acquiring raw data from the raw file selected by the user. The image processing unit 712 performs a developing process similar to the image processing unit 7*b* on the raw data provided by the raw data acquisition unit 703. Image data obtained from the developing process by the image processing unit 712 undergoes conversion processing per pixel by the three-dimensional grid data table 713. The converted image data output from the three-dimensional grid data table 713 is displayed on the display 605 by the image display unit 714. An image that has been image processed according to a selected image characteristic is thus displayed on the display 605.

Next, in step S903, the adjustment operation unit 715 provides a user interface for editing so that the image displayed in step S902 conforms to the target image characteristic. The result of the image adjustment performed by the user using this user interface is reflected as changes to the grid point data of the three-dimensional grid data table 713. Alternatively, the image processing parameter of the image processing unit 712 is adjusted as necessary. As described above, the result of adjusting the three-dimensional grid data table and the image processing unit 712 is reflected in real-time in the image being displayed on the display 605. Note that with the image adjustment, the adjustment of hue, chroma, contrast and the like is performed locally, so that the image being displayed conforms to the desired image. The user thus performs the editing operation until an image with the desired image characteristics is obtained.

In step S904, it is determined whether the user has given an instruction for completion of the editing operation. If an instruction for completion of the editing operation has not been given (NO in step S904), the processing returns to step S903. If an instruction for completion of the editing operation has been given (YES in step S904), the processing proceeds to step S905. In step S905, the setting data generation unit 716 acquires, as profile data, editing data for generating the changed three-dimensional grid data table 713, and the image processing parameter of the image processing unit 712. Note that an editing data generation unit 1119 (FIG. 11), described later using the third embodiment, is given as an exemplary configuration for acquiring editing data. The image processing parameter of the image processing unit 712 can be acquired by the setting data generation unit 716 reading an image processing parameter from a register of the image processing unit 712. Then, in step S906, the setting data generation unit 716 generates a new image characteristic (setting data) by making the matrix coefficient acquired in step S901 one set with the profile data (the image processing parameter and editing data) acquired in step S905. Note that if there is no change in the image processing parameter, the setting data generation unit 716 may directly use the image processing parameter selected in step S901.

In step S907, the image characteristic generated as described above is transmitted to the digital camera by the setting data generation unit 716 and set to make the image characteristic usable in the digital camera. For example, the image characteristic is registered in the digital camera (i.e., in the image characteristic holding unit 50) as the user setting in FIG. 5, and applied to the in-camera image processing with the foregoing procedures. The image desired by the user can thus be obtained with a JPEG image developed in-camera.

Note that in the above description, an image characteristic is selected from image characteristics stored in the image characteristic holding unit 700, although the present invention is not limited to this configuration. In the case where the header of the raw file contains an image characteristic, for example, this image characteristic may be used.

To summarize the above, an information processing apparatus that executes the image processing application of the present embodiment has a first processing unit (712), a second processing unit (713), a display unit (714), a changing unit (715), and a generating unit (716). The first processing unit (image processing unit 712) develops raw data into image data in accordance with a parameter selected by the user (in the above embodiment, an image processing parameter selected from image characteristics). The second processing unit (713) performs a three-dimensional grid data table or a matrix operation of second-order of higher on the image data output from the first processing unit. The image display unit 714 displays the image data processed by the second processing unit on the display 605, which is a display device. The changing unit (adjustment operation unit 715) changes the matrix coefficient and editing data for generating the three-dimensional grid data table of the second processing unit according to an editing operation by the user on the displayed image data. The changing unit may be configured so as to be able change the processing parameter of the first processing unit. Then, the generating unit (setting data generation unit 716) generates a setting parameter (image characteristic) that is settable in the digital camera, using the processing parameter set in the first processing unit and the parameter changed by the changing unit. Here, the processing parameter of the first processing unit is changed by the changing unit in order to prevent the occurrence of tone jump caused by an increase in the amount of change by the three-dimensional grid data table of the second processing unit.

That is, according to the above first embodiment, image adjustment is performed on an image after selecting a setting that approximates a desired image characteristic beforehand, and the result is reflected in the high-order matrix coefficient and the editing data. The image processing parameter, matrix coefficient and editing data are thus set according to the user's preferences, making it possible to prevent problems such as the image deteriorating due to unreasonable image adjustment being performed (causing tone jump, etc.).

The image characteristic holding unit 700 stores plural types of parameter sets (image characteristics) that correspond to shooting scenes, and the selection unit 702 sets the parameter selected from these plural types of parameters in the first and second processing units. This enables the user to readily select a desired image characteristic.

The selection unit 702 may be configured to acquire a parameter from the header of a raw file containing raw data, and set the acquired parameter in the first processing unit. In the case where a processing parameter, matrix coefficient and editing data are held in the header of raw data, they may be used to set the three-dimensional grid data table 713 and the image processing unit 712. Operability is improved since the user's desired image characteristic set when image capture is performed is set automatically.

The processing parameter set in the image processing unit 712 determines at least the luminance characteristic of the image (processing by the gamma transformation unit 7b4). With this application, luminance can be adjusted for various colors since the hue, chroma and luminance of various colors can be edited, while gamma transformation also enables the overall luminance characteristics to be changed. If the user wants to adjust an image having slightly high contrast, for example, selecting an image in which the contrast is slightly pronounced with the luminance characteristic of the upstream gamma transformation unit beforehand reduces the probability of tone jump occurring, since less correction is required with the downstream three-dimensional grid data table. Thus, by approximating the luminance characteristic resulting from the image processing unit 712 to a desired luminance characteristic beforehand, the amount of adjustment can be effectively reduced, and the occurrence of tone jump resulting from the three-dimensional grid data table can be effectively prevented.

Second Embodiment

As described above, there are cases in which the digital camera performs developing and generates JPEG data in-camera, and cases in which image data, called raw data, is generated directly from the array output by the CCD or CMOS sensor, without performing major image processing. In the first embodiment, the developing and image processing performed on this raw data by the application is identical to the developing and image processing performed in-camera. However, this is not particularly necessary. Image processing that cannot be performed with hardware can be achieved with an application, and a better image can be provided. In this case, the image characteristic holding unit 50 holds two types of image characteristics (e.g., two pairings of a matrix coefficient and editing data) as a pair, one for digital camera use and one for application use. Then, the image characteristic is set in the three-dimensional grid data table 7e using the matrix coefficient and editing data for digital camera use. The editing data and matrix coefficient for application use held as a pair with the matrix coefficient for digital camera use are then written to the header of the raw file. The application uses the matrix coefficient and editing data written in the header of the raw file. Similar image processing results can thus be obtained with the digital camera and the application.

For example, the number of grid points of the three-dimensional grid data table 7e in the digital camera may be 9×9×9×8 bits, whereas the number of grid points of the three-dimensional grid data table 713 in the image processing application can be 33×33×33×16 bits. In this case, in the foregoing steps S905 and S906, the setting data generation unit 716 generates a matrix coefficient and editing data for generating a three-dimensional grid data table tailored to the digital camera. That is, a matrix coefficient and editing data for generating a 9×9×9×8 bit three-dimensional grid data table are generated from the edited 33×33×33×16 bit three-dimensional grid data table, and used as the image characteristic for the digital camera. Note that the matrix coefficient can be used commonly in the two grid data tables, whereas the editing data may need to be provided according to the number of grid points, although according to the foregoing method, the editing data is compatible with an arbitrary number of grid points.

With image processing application software, bit precision can be readily increased, although processing speed is clearly slower than hardware. In view of this, increasing processing speed by different means to hardware and further performing means for dealing with problems enables image processing that differs from in-camera image processing to be performed. If, in this case, a three-dimensional grid data table generated from a matrix coefficient and editing data stored in the camera is used, the results may differ between the camera and the image processing application.

In view of this, the camera stores a matrix coefficient and editing data for in-camera use and a matrix coefficient and editing data for image processing application software use, in order to obtain the same image with the application as the JPEG image acquired with the digital camera. An image characteristic that includes the matrix coefficient and editing data for image processing application software use is then written to the header of the raw file. The image processing application software extracts the high-order matrix coefficient and editing data for image processing application software use from the header of the raw file, and uses them to generate a three-dimensional grid data table. With this configuration, an image with the same color reproduction can be obtained even in the case where image processing by the digital camera and the image processing application differs. Note that the image processing parameter may also be prepared respectively for the image processing unit 7b and the image processing unit 712.

On the other hand, in the above case, the three-dimensional grid data table adjusted using the image processing application needs to be converted in step S905 to a three-dimensional grid data table compatible with the image processing of the digital camera. In this case, the three-dimensional grid data table should be converted for use in the digital camera, so as to absorb the difference between the characteristics of the image processing by the image processing application and the digital camera. For example, a compensation three-dimensional grid data table is provided that holds magnification coefficients or the like per grid point for canceling the difference between the images output by the image processing application and the digital camera. A three-dimensional grid data table adapted to the image processing of the digital camera is then obtained by converting the adjusted three-dimensional grid data table using the compensation three-dimensional grid data table. Matrix coefficient and editing data for generating the three-dimensional grid data table thus converted are generated, and set as an image processing characteristic for digital camera use. As aforementioned, the image processing characteristic for digital camera use and the image processing characteristic for application use are registered as a pair in the digital camera.

As described above, according to the second embodiment, a changed parameter (e.g., three-dimensional grid point data) is converted to a parameter compatible with the processing accuracy (resolution performance) of the digital camera. In the above example, a three-dimensional grid data table with 33×33×33×16 bit precision is converted to a three-dimensional grid data table with 9×9×9×8 bit precision that accords with the image processing accuracy of the digital camera. A new setting parameter is then generated using this converted parameter. Consequently, a parameter whose precision is suitable for a digital camera can be generated, irrespective of the image processing accuracy of the application.

Third Embodiment

A third embodiment will be described next. In the first and second embodiments, a configuration was described in which an image processing parameter, matrix coefficient and editing data are registered as an image processing characteristic, and used in setting the image processing unit 7b and generating a three-dimensional grid data table. In the third embodiment, a configuration having a matrix coefficient and editing data as an image processing characteristic will be described.

Figure 10:
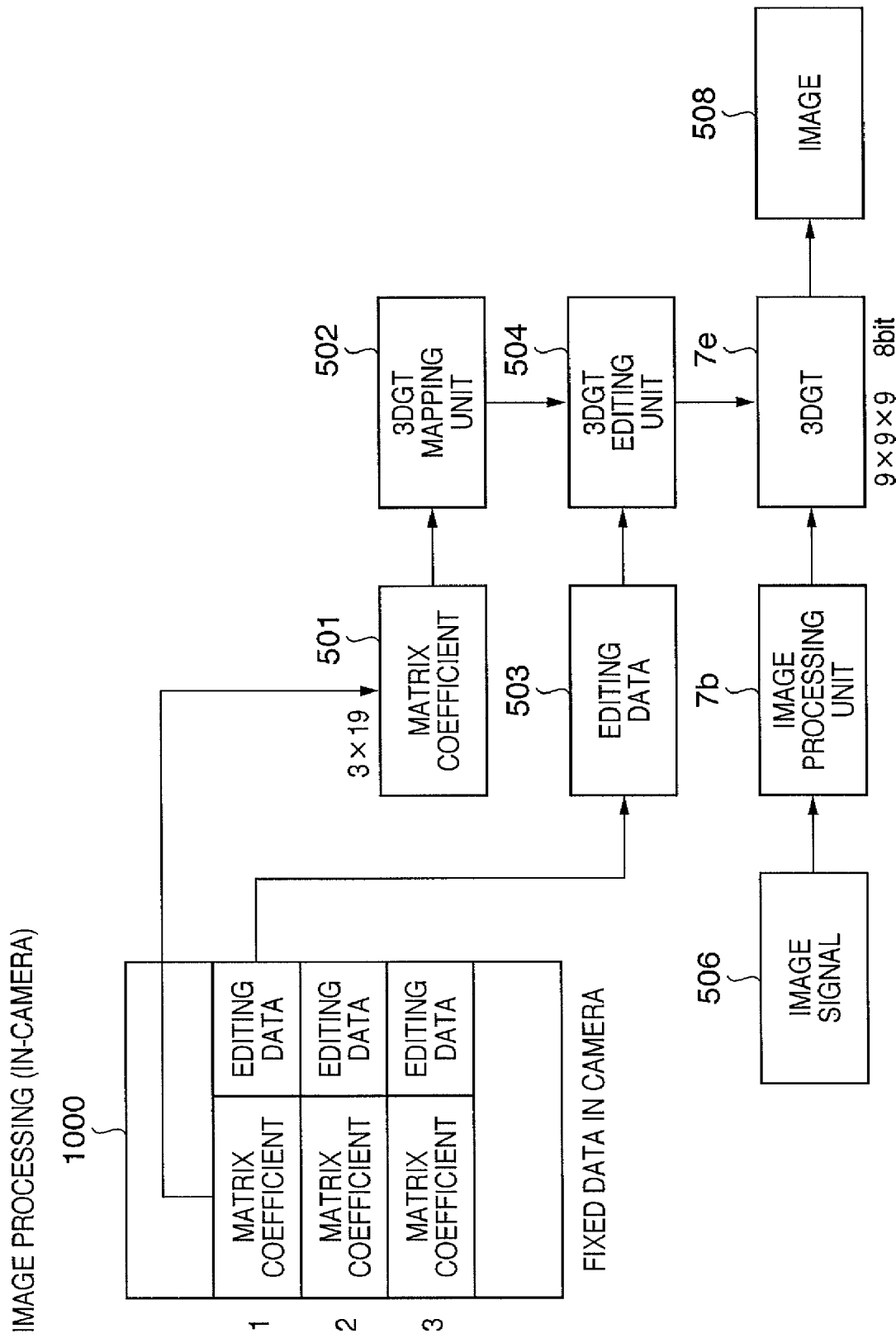
FIG. 10 illustrates the image processing of a digital camera according to a third embodiment.

FIG. 10 illustrates the image processing of the digital camera according to the third embodiment. In FIG. 10, an image characteristic holding unit 1000 does not hold an image processing parameter, in comparison with the image characteristic holding unit 50 of FIG. 5. When a desired image processing characteristic (matrix coefficient/editing data pair) is selected using a selection unit (not shown), a three-dimensional grid data table 7e is generated by the 3DGT mapping unit 502 and the 3DGT editing unit 504. Image data 508 is generated from raw data (image signal 506) using the image processing unit 7b and this three-dimensional grid data table 7e. The detailed processing is as described above using FIG. 5. A difference with FIG. 5 is that the setting of the image processing unit 7b using an image processing parameter is omitted.

Figure 11:
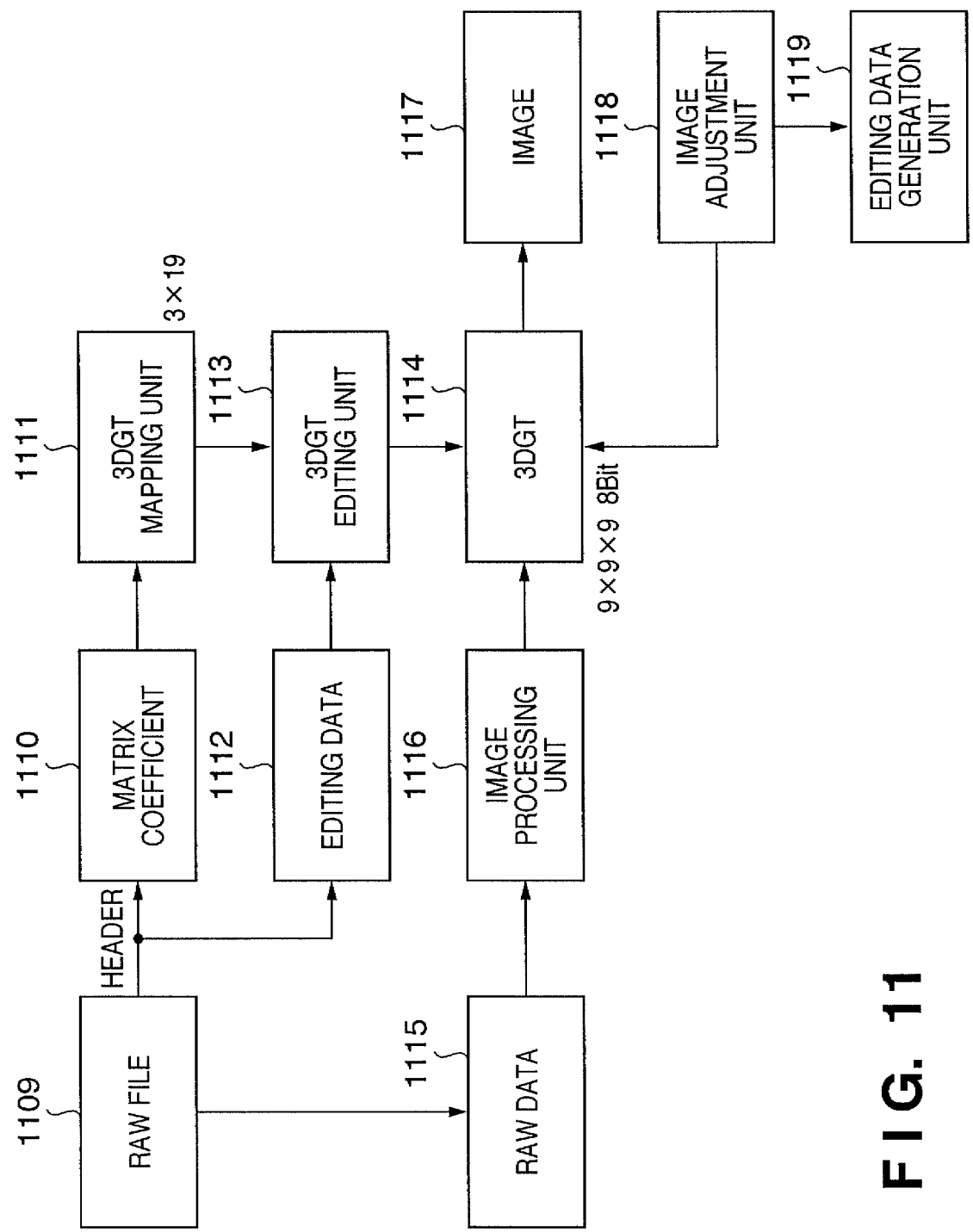
FIG. 11 illustrates image processing by an information processing apparatus according to the third embodiment.

FIG. 11 is a block diagram illustrating an exemplary functional configuration of the image processing application according to the third embodiment. Note that the functions shown in FIG. 11 are realized by the CPU 601 shown in FIG. 6 executing prescribed control programs loaded into the RAM 603. As aforementioned, high-order matrix operations can also be executed by the image processing application, although the computations (processing) take time. In view of this, in the present embodiment, the processing time is shortened by creating a three-dimensional grid data table (3DGT 1114) such as described above from a matrix coefficient 1110.

In the case of a grid data table having 33 grid points, for example, a three-dimensional grid data table can be produced by performing (33×33×33=) 35937 points worth of computations for RGB. Matrix operations on 10 megapixel data, for instance, will be completed in 1/300th of the time. The computation time can be shortened by then performing conversion using the three-dimensional grid data table.

However, in the case where a three-dimensional grid data table is held as data, more than 210 Kbytes are required to store the grid data table at 16-bit precision. The writing of image files takes an extremely long time when plural pieces of such data is saved in the memory of the camera, and they are all written for every piece of captured data.

In view of this, a 3DGT mapping unit 1111 calculates the grid point data of the three-dimensional grid data table using the high-order matrix coefficient 1110 stored in the header of a raw file 1109. Also, a 3DGT editing unit 1113 locally rewrites (edits) the grid point data of the three-dimensional grid data table, based on editing data 1112 stored in the header of the raw file 1109. The grid point data of the three-dimensional grid data table is edited in accordance with the chromaticity point, hue angle range, and amount of change of the hue angle shown by the editing data, similarly to the 3DGT editing unit 504 of the digital camera. Note that the editing data may include plural sets (editing instructions) each composed of a chromaticity point, a hue angle range, and an amount of change of the hue angle. In this case, the 3DGT editing unit 1113 sequentially extracts the plurality of editing instructions included in the editing data, and edits the grid point data.

Once the three-dimensional grid data table 1114 is thus generated, the image processing unit 1116 performs a similar developing process to the image processing unit 7b on raw data 1115 included in the raw file 1109. The obtained image data is then processed by the three-dimensional grid data table 1114, and a processed image 1117 is obtained.

Note that the image processing apparatus of the present embodiment provides a user interface for image adjustment, and is able to receive image adjustment instructions from the user.

An image adjustment unit 1118 displays a user interface for image adjustment (for editing operations), together with displaying the image 1117 on the display 605. The user is able to use this user interface to specify a desired color to be edited, the color after conversion, and the color gamut that is to influence this adjustment. As for the means of specifying a color, it is possible to specify the chromaticity point and specify hue, chroma and luminance with all of the attributes, or to specify only hue, and adjust all of the colors that include the specified hue. The image adjustment unit 1118 changes the three-dimensional grid data table 1114 according to an adjustment operation by the user input via the user interface. When the three-dimensional grid data table 1114 is changed, the change is immediately reflected in the image processing on the raw data 1115, and the image 1117 resulting from the adjustment is obtained in real-time. Displaying the adjusted image 1117 on the display 605 enables the user to immediately see the editing result.

The image adjustment unit 1118 further notifies the adjustment content to an editing data generation unit 1119. The editing data generation unit 1119 generates editing data based on the notified adjustment content. Once image adjustment has ended, the editing data generation unit 1119 adds the editing data generated according to the current adjustment operation to the editing data 1112, and generates new editing data. The matrix coefficient 1110 and the new editing data are then held as a pair. The matrix coefficient 1110/new editing data pair is made available for use by being registered in the image characteristic holding unit 1000 of the digital camera. Note that if editing data does not exist, the editing data generated according to the current adjustment operation is registered in association with the matrix coefficient 1110.

Figure 12:
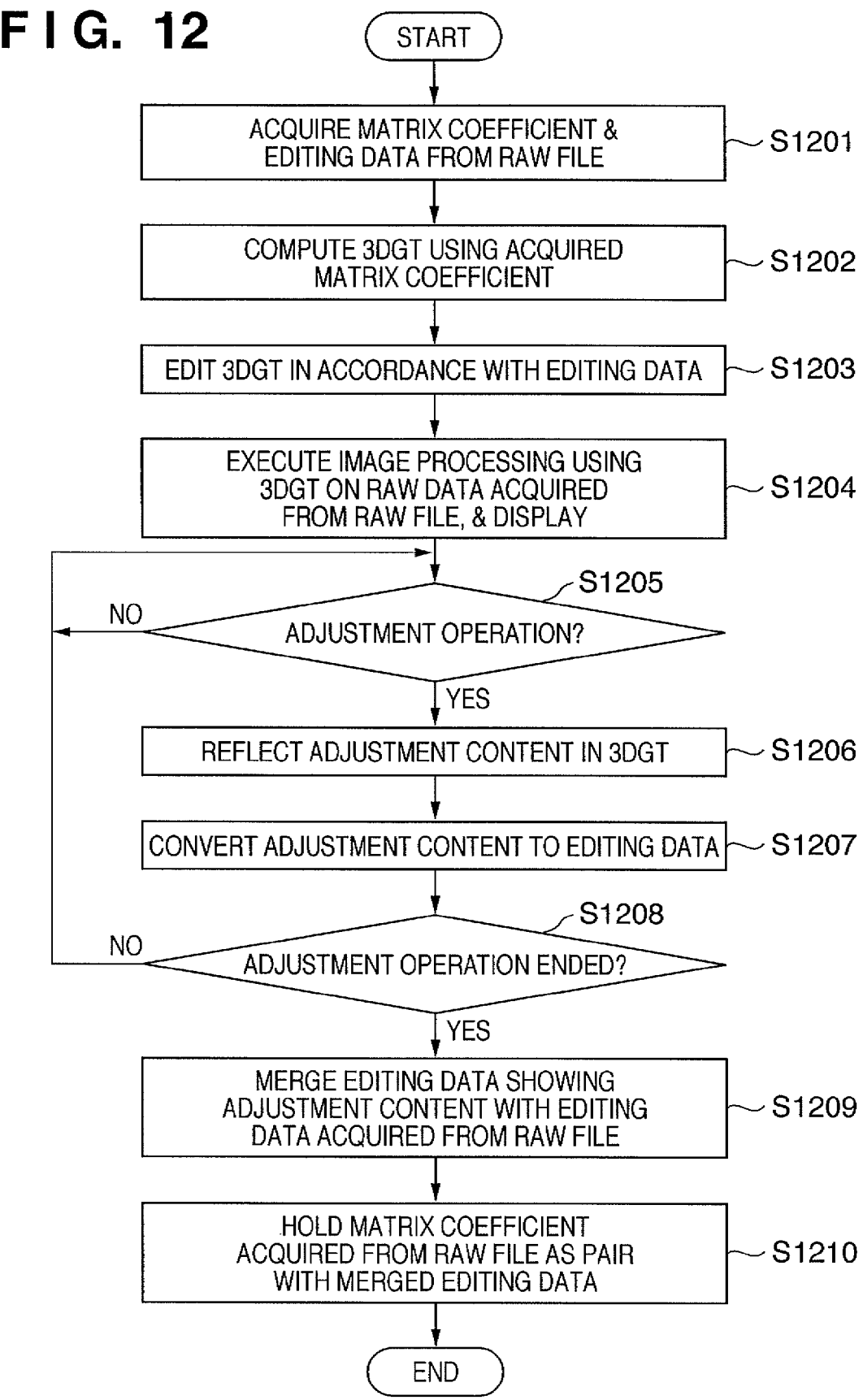
FIG. 12 is a flowchart illustrating the image processing of an image processing application according to the third embodiment.

The above operations of the image processing application will be described using the flowchart of FIG. 12.

In step S1201, the image processing application presents a user interface for selecting a raw file, and allows the user to select a desired raw file. The matrix coefficient 1110 and the editing data 1112 are acquired from the header of the selected raw file 1109.

In step S1202, the 3DGT mapping unit 1111 calculates the grid point data of a three-dimensional grid data table using the acquired matrix coefficient 1110. In step S1203, the 3DGT editing unit 1113 rewrites the grid point data of the three-dimensional grid data table calculated in step S1202 using the editing data 1112 acquired in step S1201, and sets the three-dimensional grid data table 1114. In step S1204, the image processing unit 1116 acquires the raw data 1115 from the raw file, performs similar processing to the image processing unit 7*b* of the digital camera on the raw data 1115, and outputs image data. The image 1117 is then obtained by applying conversion processing to the image data obtained from the image processing unit 1116, using the three-dimensional grid data table 1114. The image 1117 is displayed on the display 605, for example.

Next, when an instruction for adjustment operation is given by the user (YES in step S1205), processing proceeds to step S1206. In step S1206, the image adjustment unit 1118 reflects the instructed adjustment content in the three-dimensional grid data table 1114. In step S1207, the adjustment content is notified to the editing data generation unit 1119. The editing data generation unit 1119 generates editing data showing the notified adjustment content.

If the adjustment operation has not ended (NO in step S1208), processing returns to step S1205. On the other hand, when an instruction for completion of the adjustment operation is given by the user (YES in step S1208), processing proceeds to step S1209. In step S1209, the editing data generation unit 1119 generates new editing data by merging the editing data generated in step S1207 with the editing data 1112 acquired from the raw file 1109. Then, in step S1210, the matrix coefficient 1110 acquired from the raw file 1109 and the new editing data generated in step S1209 are paired and held as a new parameter.

As described above, according to the third embodiment, a pairing composed of a matrix coefficient that forms the basis of a three-dimensional grid data table and editing data that enables the grid point data of the three-dimensional grid data table to be rewritten is held. Since the three-dimensional grid data table is edited based on the editing data, memory usage in the camera is reduced, and accurate color reproduction relative to the target is possible.

Note that a grid data table of a required number of grid points can be created from a matrix coefficient. Even in the case where the three-dimensional grid data table in the camera has only 9×9×9 grid points, for example, the application is able to produce a three-dimensional grid data table with 33×33×33 grid points, without needing to decrease precision. This is an effective method of using matrix coefficients, despite a difference appearing in color reproduction accuracy.

Fourth Embodiment

Figure 13:
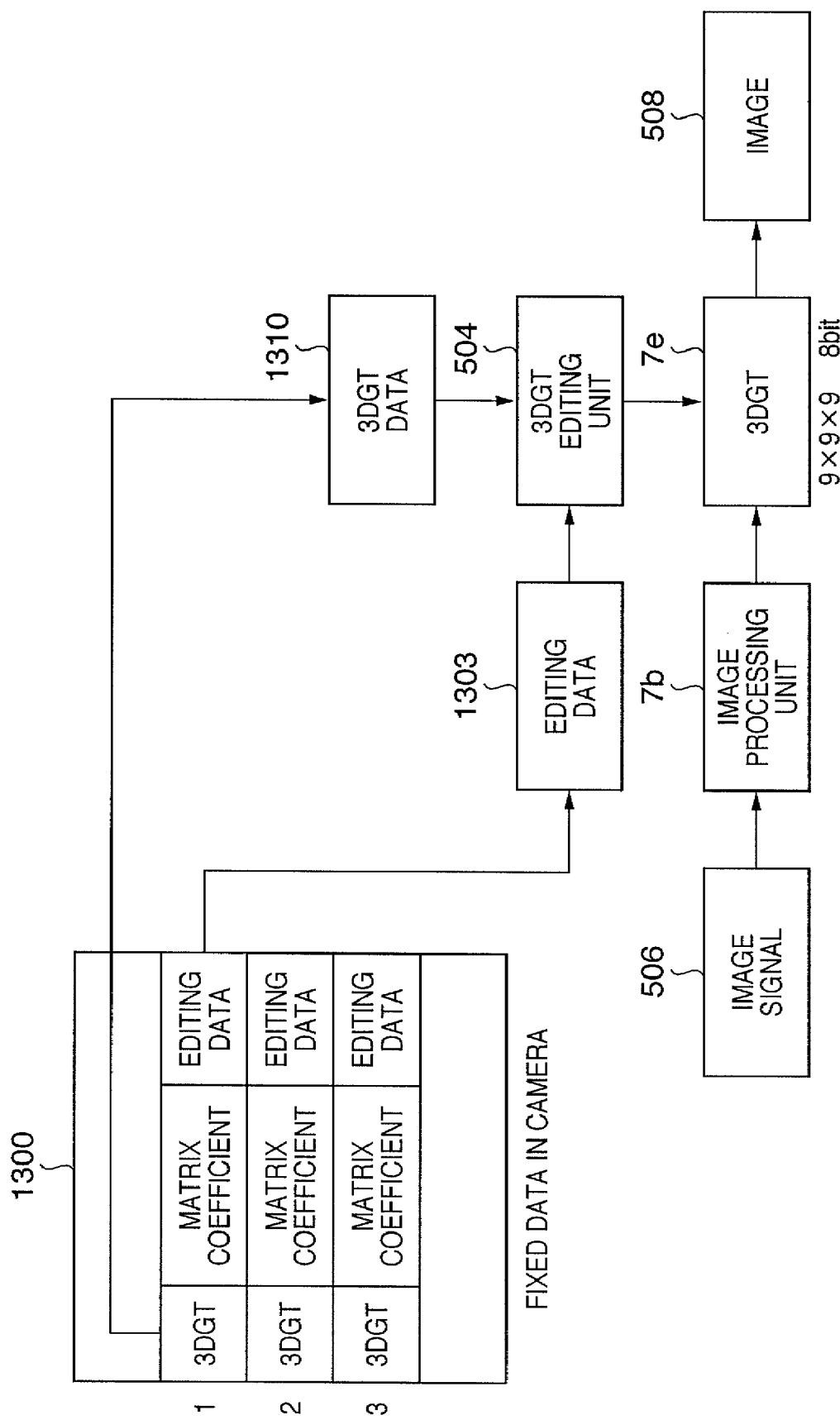
FIG. 13 illustrates the image processing of a digital camera according to a fourth embodiment.

A fourth embodiment will be described next. FIG. 13 is a block diagram illustrating the image processing of the digital camera according to the fourth embodiment.

There are cases in which the digital camera performs a developing process and generates JPEG data in-camera, and cases in which image data, called raw data, is generated directly from the array output by the CCD or CMOS sensor, without performing major image processing. The processing performed on this raw data by the image processing application is identical to the in-camera image processing, although this is not particularly necessary. Image processing that cannot be performed with the hardware of a digital camera can be achieved with an application and a better image provided. The fact that with the application software described in the third embodiment, the number of grid points of the three-dimensional grid data table need not be the same as the hardware of the camera is given as one example of this.

However, while bit precision can be readily increased with application software, processing speed is clearly slower than hardware. In view of this, increasing processing speed by different means to that of hardware and further performing means for dealing with problems enables image processing that differs from in-camera image processing to be performed. Thus, in the case where the image processing performed by the image processing application and the digital camera differs, the image processing results may differ if the three-dimensional grid data table or matrix coefficient stored in the digital camera is used directly.

In view of this, in the fourth embodiment, an image characteristic holding unit 1300 is used, as shown in FIG. 13, in order to obtain the same image as a JPEG image captured and image processed by the digital camera. The image characteristic holding unit 1300 stores three-dimensional grid data table data for digital camera use in association with editing data and matrix coefficients that form the basis of three-dimensional grid data table data for application software use. In the digital camera, the 3DGT editing unit 504 edits three-dimensional grid point data (3DGT data 1310) selected from the image characteristic holding unit 1300, in accordance with corresponding editing data 1303. The three-dimensional grid data table 7*e* is determined using the edited grid point data.

In the case of generating a raw file, the digital camera stores the matrix coefficient and editing data corresponding to the selected 3DGT data 1310 in the header. As described in the third embodiment, the information processing apparatus generates a grid data table using the matrix coefficient and editing data acquired from the header of the raw file, and uses the acquired matrix coefficient and editing data in image processing.

As described above, according to the fourth embodiment, an image having the same color reproduction can be obtained from a set composed of three-dimensional grid point data, a high-order matrix coefficient, and editing data showing local editing of a three-dimensional grid data table, even with respect to different image processing methods.

Note that editing data can also be used to absorb the difference between in-camera image processing and image processing by the image processing application. In this case, an image characteristic held by the image characteristic holding unit 1300 is paired with a matrix coefficient and editing data. The digital camera directly uses the three-dimensional grid data table calculated from the matrix coefficient, without using the editing data. On the other hand, the image processing application edits the three-dimensional grid data table calculated from the matrix coefficient, using the editing data. This configuration enables the difference in image processing to be absorbed, in the case where the editing content of the editing data is used to absorb the difference between in-camera image processing and image processing by the image processing application.

Note that in the foregoing embodiments, the data of a three-dimensional grid data table may be based on any color space, including "red, green, blue", "Y, U, V", "L*, a*, b*" or "X, Y, Z".

Also, in the foregoing embodiments, one matrix coefficient is paired with one piece of editing data, although the present invention is not limited to this configuration. That is, plural pieces of editing data may be associated with one matrix coefficient, or a plurality of matrix coefficients may be associated with one piece of editing data.

Also, in the foregoing embodiments, editing data is created by an image processing application (image adjustment unit 1118, editing data generation unit 1119) run on an information processing apparatus, although the present invention is not limited to this configuration. For example, by loading the same functions as the foregoing image processing application in a digital camera, color adjustment or the like may be performed and editing data may be generated using the rear LCD of the digital camera.

Other Embodiments

Note that the present invention covers the case where the functions of the foregoing embodiments are achieved by directly or indirectly supplying a software program to a system or apparatus, and using a computer in the system or apparatus to read and execute the supplied program code. In this case, the supplied program corresponds to the flowcharts shown by the drawings in the embodiments.

Consequently, the actual program code installed on a computer in order to realize the functional processing of the present invention by computer also realizes the present invention. That is, the present invention also covers the actual computer program for realizing the functional processing of the present invention.

In this case, provided the system or apparatus has the functions of the program, the program may be executed in any form, such as object code, a program executed by an interpreter, or script data supplied to an operating system.

Examples of computer-readable storage media for supplying the program include floppy disk, hard disk, optical disk, magneto-optical disk, CD-ROM, CD-R, CD-RW, magnetic tape, nonvolatile memory card, ROM, and DVD (DVD-ROM, DVD-R).

Alternatively, the program can also be supplied by connecting to a website on the Internet using the browser of a client computer, and downloading the computer program of the present invention from the website to a recording medium such as a hard disk. In this case, the downloaded program may be a compressed file including an auto-install function. The present invention can be realized by dividing the program code constituting the program of the present invention into a plurality of files and downloading the respective files from different websites. That is, a World Wide Web (WWW) server that allows a plurality of users to download program files for implementing the functional processing of the present invention with a computer is also covered by the present invention.

The program of the present invention can also be distributed to users by being encrypted and stored on a storage medium such as a CD-ROM. In this case, users who meet prescribed requirements are allowed to download decryption key information from a website via the Internet, and the program decrypted using this key information is executed and installed on a computer.

Apart from being realized by a computer executing the read program, the functions of the foregoing embodiments may be realized in coordination with an operating system or the like running on a computer, based on instructions in the program. In this case, an operating system or the like performs part or all of the actual processing, and the functions of the foregoing embodiments are realized by this processing.

Further, part or all of the functions of the foregoing embodiments may be realized by writing the program read from the storage medium to a memory provided in a function expansion board inserted into a computer or a function expansion unit connected to a computer. In this case, a CPU or the like provided in the function expansion board or the function expansion unit performs part or all of the actual processing based on instructions in the program, after the program has been written to the function expansion board or the function expansion unit.

As described above, the foregoing embodiments enable the occurrence of problems such as tone jump to be prevented in the case where the user adjusts image processing parameters to realize desired color reproduction.

The embodiments also enable the degree of freedom of image processing to be improved while making it possible to hold matrix coefficients. That is, it is possible to realize both the benefits of high-order matrix coefficients, which have a smaller information volume than a three-dimensional grid data table, and accurate color reproduction of a target obtained by means for locally editing a three-dimensional grid data table.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-031280, filed Feb. 9, 2007, Japanese Patent Application No. 2007-050196, filed Feb. 28, 2007 and Japanese Patent Application No. 2007-327994, filed Dec. 19, 2007, which are hereby incorporated by reference herein in their entirety.

What is claimed is:

1. An image capturing apparatus that has a three-dimensional grid data table, comprising:
 a holding unit configured to hold a matrix coefficient which is a basis of the three-dimensional grid data table at an arbitrary number of grid points, and editing data for editing grid point data of the three-dimensional grid data table;
 a calculating unit configured to calculate the grid point data of the three-dimensional grid data table at a predetermined number of grid points by performing a matrix operation using the matrix coefficient;
 an editing unit configured to edit the grid point data of the three-dimensional grid data table calculated by the calculating unit, based on the editing data; and
 a generating unit configured to generate an image file which includes raw image data acquired by image capturing without color converting using grid point data based on the matrix coefficient, the editing data, and the matrix coefficient.

2. The image capturing apparatus according to claim 1, wherein the editing data includes a target value in a color space showing an editing target color, an extent of influence showing an extent of influence of editing in the color space, and a change amount showing a direction and a size of change in the color space resulting from editing, and the editing unit edits the grid point data of the three-dimensional grid data table, so that a color of the extent of influence centered on the target value changes as shown by the change amount.

3. The image capturing apparatus according to claim 2, wherein the target value is shown by a chromaticity point, the extent of influence is shown by a range of a hue angle, and the change amount is shown by at least one of a change amount of the hue angle, a fluctuation amount of chroma, and a fluctuation amount of brightness.

4. The image capturing apparatus according to claim 1, wherein the three-dimensional grid data table is positioned after white balance processing and before compression processing by a processing unit.

5. The image capturing apparatus according to claim 1, further comprising an image processing unit configured to develop raw data into image data, wherein the holding unit further holds an image processing parameter for setting in the image processing unit.

6. The image capturing apparatus according to claim 5, wherein
the holding unit holds a plurality of parameter sets each composed of a matrix coefficient, editing data and an image processing parameter, and
the image capturing apparatus further comprises a selecting unit configured to allow a user to select, from the plurality of parameter sets held in the holding unit, a parameter set to be used in generating the three-dimensional grid data table and setting the image processing unit.

7. The image capturing apparatus according to claim 5, wherein the image processing parameter for setting in the image processing unit determines at least a luminance characteristic of an image obtained by the image processing unit.

8. An image capturing apparatus that has a three-dimensional grid data table, comprising:
a holding unit configured to hold, in association with each other, a matrix coefficient for use by an application run on an external apparatus, which is a basis of the three-dimensional grid data table at an arbitrary number of grid points, three-dimensional grid point data of the three-dimensional grid data table at a predetermined number of grid points for use by the image capturing apparatus, and editing data for editing grid point data of the three-dimensional grid data table;
a setting unit configured to set the three-dimensional grid data table using the three-dimensional grid point data;
an editing unit configured to edit the grid point data of the three-dimensional grid data table set by the setting unit, based on the editing data;
a processing unit configured to process raw image data acquired by image capturing, using the three-dimensional grid data table edited by the editing unit; and
a generating unit configured to generate a raw file that includes the raw image data, the editing data and the matrix coefficient corresponding to the three-dimensional grid point data.

9. An information processing apparatus that develops raw data, comprising:
an acquiring unit configured to acquire a matrix coefficient, which is a basis of a three-dimensional grid data table at an arbitrary number of grid points, from a raw file, and editing data for editing grid point data of the three-dimensional grid data table;
a calculating unit configured to calculate the grid point data of the three-dimensional grid data table at a predetermined number of grid points by performing a matrix operation using the matrix coefficient;
an editing unit configured to edit the grid point data of the three-dimensional grid data table calculated by the calculating unit, based on the editing data; and
a processing unit configured to image process data of the raw file that includes raw image data not processed by the processing unit without color converting using grid point data based on the matrix coefficient, using the three-dimensional grid data table edited by the editing unit.

10. The information processing apparatus according to claim 9, wherein
the processing unit further includes a developing unit that develops raw data into image data, and
the acquiring unit further acquires an image processing parameter for setting in the developing unit.

11. The information processing apparatus according to claim 10, further comprising a holding unit configured to hold a plurality of parameter sets each composed of a matrix coefficient, editing data and an image processing parameter, and
wherein the acquiring unit comprises a selecting unit for allowing a user to select, from the plurality of parameter sets held in the holding unit, a parameter set to be used in generating the three-dimensional grid data table and setting the developing unit.

12. The information processing apparatus according to claim 10, wherein the image processing parameter for setting in the developing unit determines at least a luminance characteristic of an image obtained by the processing unit.

13. An information processing apparatus that develops raw data, comprising:
a processing unit that includes a three-dimensional grid data table at a predetermined number of grid points, which is generated based on a matrix coefficient which is a basis of the three-dimensional grid data table at an arbitrary number of grid points, and develops the raw data;
a display unit configured to display image data obtained as a result of the raw data being developed by the processing unit;
an interface unit configured to provide a user interface for instructing editing in relation to the image data displayed by the display unit;
a first generating unit configured to generate editing data for changing grid point data of the three-dimensional grid data table, based on an editing operation instructed via the user interface; and
a second generating unit configured to generate a raw file that includes raw image data not processed by the processing unit without color converting using grid point data based on the matrix coefficient, the editing data and the matrix coefficient corresponding to the three-dimensional grid point data.

14. The information processing apparatus according to claim 13, wherein the first generating unit generates editing data of a processing accuracy of a digital camera.

15. An image processing method of an image capturing apparatus that has a three-dimensional grid data table, comprising:
holding, in a memory, a matrix coefficient which is a basis of the three-dimensional grid data table at an arbitrary number of grid points, and editing data for editing grid point data of the three-dimensional grid data table;
calculating the grid point data of the three-dimensional grid data table at a predetermined number of grid points by performing a matrix operation using the matrix coefficient;
editing the calculated grid point data of the three-dimensional grid data table, based on the editing data; and
generating an image file which includes image data acquired by image capturing without color converting using grid point data based on the matrix coefficient, the editing data, and the matrix coefficient which are stored with a raw image file.

16. A non-transitory computer-readable storage medium storing computer-executable instructions for causing a computer to execute an image processing method as claimed in claim 15.

17. An image processing method of an image capturing apparatus that has a three-dimensional grid data table, comprising:
holding, in a memory in association with each other, a matrix coefficient for use by an application run on an external apparatus, which is a basis of the three dimensional grid data table at an arbitrary number of grid points, three-dimensional grid point data of the three-dimensional grid data table at a predetermined number of grid points for use by the image capturing apparatus, and editing data for editing grid point data of the three-dimensional grid data table;

setting the three-dimensional grid data table using the three-dimensional grid point data;

editing the grid point data of the set three-dimensional grid data table, based on the editing data;

processing image data acquired by image capturing, using the edited three-dimensional grid data table; and generating a raw file that includes raw image data not processed without color converting using grid point data based on the matrix coefficient, the editing data and the matrix coefficient corresponding to the three-dimensional grid point data.

18. A non-transitory computer-readable storage medium storing computer-executable instructions for causing a computer to execute an image processing method as claimed in claim 17.

19. An image processing method of an information processing apparatus that develops raw data, comprising:

acquiring a matrix coefficient which is a basis of a three-dimensional grid data table at an arbitrary number of grid points from a raw file, and editing data for editing grid point data of the three-dimensional grid data table;

calculating the grid point data of the three-dimensional grid data table at a predetermined number of grid points by performing a matrix operation using the matrix coefficient;

editing the calculated grid point data of the three-dimensional grid data table, based on the editing data; and image processing data of the raw file that includes raw image data not processed without color converting using grid point data based on the matrix coefficient, using the edited three-dimensional grid data table.

20. A non-transitory computer-readable storage medium storing computer-executable instructions for causing a computer to execute an image processing method as claimed in claim 19.

21. An image processing method of an information processing apparatus that develops raw data, comprising:

generating a three-dimensional grid data table at a predetermined number of grid points based on a matrix coefficient which is a basis of the three-dimensional grid data table at an arbitrary number of grid points, and developing the raw data;

displaying image data obtained as a result of the raw data being developed;

providing a user interface for instructing editing in relation to the displayed image data;

generating editing data for changing grid point data of the three-dimensional grid data table, based on an editing operation instructed via the user interface; and generating a raw file that includes raw image data not processed without color converting using grid point data based on the matrix coefficient, the editing data and the matrix coefficient corresponding to the three-dimensional grid point data.

22. A non-transitory computer-readable storage medium storing computer-executable instructions for causing a computer to execute an image processing method as claimed in claim 21.

* * * * *